(12) United States Patent
Hong

(10) Patent No.: US 7,330,428 B2
(45) Date of Patent: Feb. 12, 2008

(54) GROOMING SWITCH HARDWARE SCHEDULER

(75) Inventor: Bo Hong, San Jose, CA (US)

(73) Assignee: LSI Logic Corporation, Milpitas, CA (US)

( * ) Notice: Subject to any disclaimer, the term of this patent is extended or adjusted under 35 U.S.C. 154(b) by 1011 days.

(21) Appl. No.: 10/420,017

(22) Filed: Apr. 18, 2003

(65) Prior Publication Data

US 2004/0114586 A1 Jun. 17, 2004

Related U.S. Application Data

(60) Provisional application No. 60/432,694, filed on Dec. 11, 2002.

(51) Int. Cl.
*H04Q 11/06* (2006.01)

(52) U.S. Cl. .................. 370/230; 370/386; 370/369

(58) Field of Classification Search ................ 370/386, 370/388, 369, 370, 371, 372, 374, 378, 230
See application file for complete search history.

(56) References Cited

U.S. PATENT DOCUMENTS

| | | | |
|---|---|---|---|
| 3,576,398 | A | 4/1971 | Dejean et al. |
| 3,632,883 | A | 1/1972 | Augaard |
| 3,735,049 | A | 5/1973 | Buchner et al. |
| 3,736,381 | A | 5/1973 | Johnson et al. |
| 3,832,492 | A | 8/1974 | Charransol et al. |
| 3,927,267 | A | 12/1975 | Voyer et al. |
| 4,004,103 | A | 1/1977 | Liu et al. |
| 4,035,584 | A | 7/1977 | Lurtz |
| 4,038,638 | A | 7/1977 | Hwang |
| 4,123,624 | A | 10/1978 | Gagnier et al. |
| 4,394,541 | A | 7/1983 | Seiden |
| 4,470,139 | A | 9/1984 | Munter |
| 4,566,007 | A | 1/1986 | Richards |
| 4,764,918 | A | 8/1988 | Waters |
| 4,771,420 | A | 9/1988 | Deschaine et al. |
| 4,797,589 | A | 1/1989 | Collins |
| 4,817,083 | A | 3/1989 | Richards |
| 4,849,964 | A | 7/1989 | Van Baardewijk |
| 4,935,921 | A | 6/1990 | Ishizaki et al. |
| 4,967,405 | A | 10/1990 | Upp et al. |
| 5,040,170 | A | 8/1991 | Upp et al. |
| 5,111,414 | A | 5/1992 | Arrathoon |

(Continued)

OTHER PUBLICATIONS

Hwang, Frank K., et al., "On Nonblocking Multicast Three-State Clos Networks", IEEE/ACM *Transactions on Networking*, vol. 8(4), 535-539 (2000).

(Continued)

*Primary Examiner*—Ricky Q. Ngo
*Assistant Examiner*—Ankit P Gandhi
(74) *Attorney, Agent, or Firm*—Christopher P. Maiorane PC

(57) ABSTRACT

A hardware scheduler for a grooming switch with at least three switching stages accumulates a list of connection requests that cannot be granted given currently granted connection assignments. At a designated time, two data structures are dynamically built: an xRAM which records, for each output of a switch slice, which input is currently assigned to that output; and a yRAM which records, for each of the same outputs, the output of a second switch slice that is connected to a corresponding input of the second switch slice. Connections are assigned to satisfy the stored unassigned requests, by reassigning existing connection assignments using the xRAM and yRAM data structures.

23 Claims, 24 Drawing Sheets

U.S. PATENT DOCUMENTS

| | | | |
|---|---|---|---|
| 5,144,297 | A | 9/1992 | Ohara |
| 5,189,410 | A | 2/1993 | Kosugi et al. |
| 5,311,506 | A | 5/1994 | Beisel |
| 5,323,390 | A | 6/1994 | Pawelski |
| 5,345,441 | A | 9/1994 | Paker et al. |
| 5,408,231 | A | 4/1995 | Bowdon |
| 5,430,716 | A | 7/1995 | Pawelski |
| 5,436,890 | A | 7/1995 | Read et al. |
| 5,469,154 | A | 11/1995 | Karp |
| 5,526,359 | A | 6/1996 | Read et al. |
| 5,629,932 | A | 5/1997 | Kim |
| 5,671,222 | A * | 9/1997 | Chen et al. .................. 370/388 |
| 5,987,027 | A | 11/1999 | Park et al. |
| 6,034,947 | A | 3/2000 | Yoshida et al. |
| 6,041,055 | A | 3/2000 | Chopping |
| 7,154,887 | B2 * | 12/2006 | Wu et al. .................. 370/388 |
| 2001/0053160 | A1 * | 12/2001 | Dally ......................... 370/535 |
| 2002/0146003 | A1 * | 10/2002 | Kam et al. .................. 370/388 |
| 2003/0021267 | A1 * | 1/2003 | Wu et al. .................... 370/388 |
| 2004/0095927 | A1 * | 5/2004 | Chang et al. ............... 370/388 |
| 2005/0117573 | A1 * | 6/2005 | Konda ........................ 370/388 |

OTHER PUBLICATIONS

Benes, V.E., "On Rearrangeable Three-Stage Connecting Networks," The Bell System Technical Journal, vol. XLI, No. 5, Sep. 1962, pp. 1481-1492.

Clos, Charles, "A Study of Non-Blocking Switching Networks," Bell System Technical Journal, Mar. 1953, pp. 406-424.

"Lucent Technologies introduces cross-connect ship for high-speed optical networking systems," 1999, http://www.chipcenter.com/telecommunications/mdp/webscan/mn00e/mn00e016.htm; 2 pages.

"900-Series DSX (Digital Signal Cross-Connect) System," 1996, http/connectivity1.avaya.com/exchangemax/fact_sheets/pdf/2883fs-3.pdf, 6 pages.

Benes, V.E., "Mathematical Theory of Connecting Networks and Telephone Traffic", *Academic Press*, 1965, pp. 82-95.

* cited by examiner

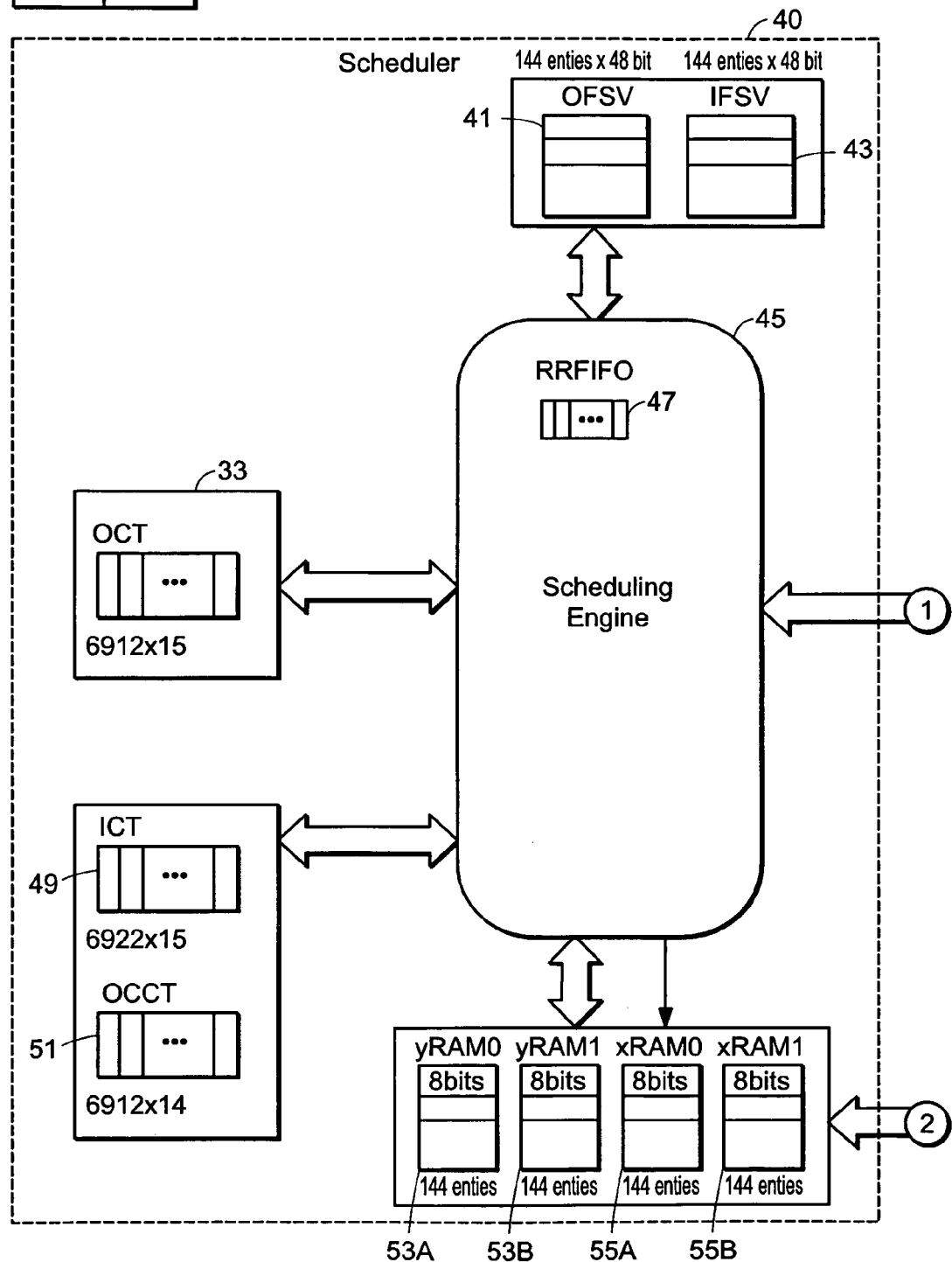

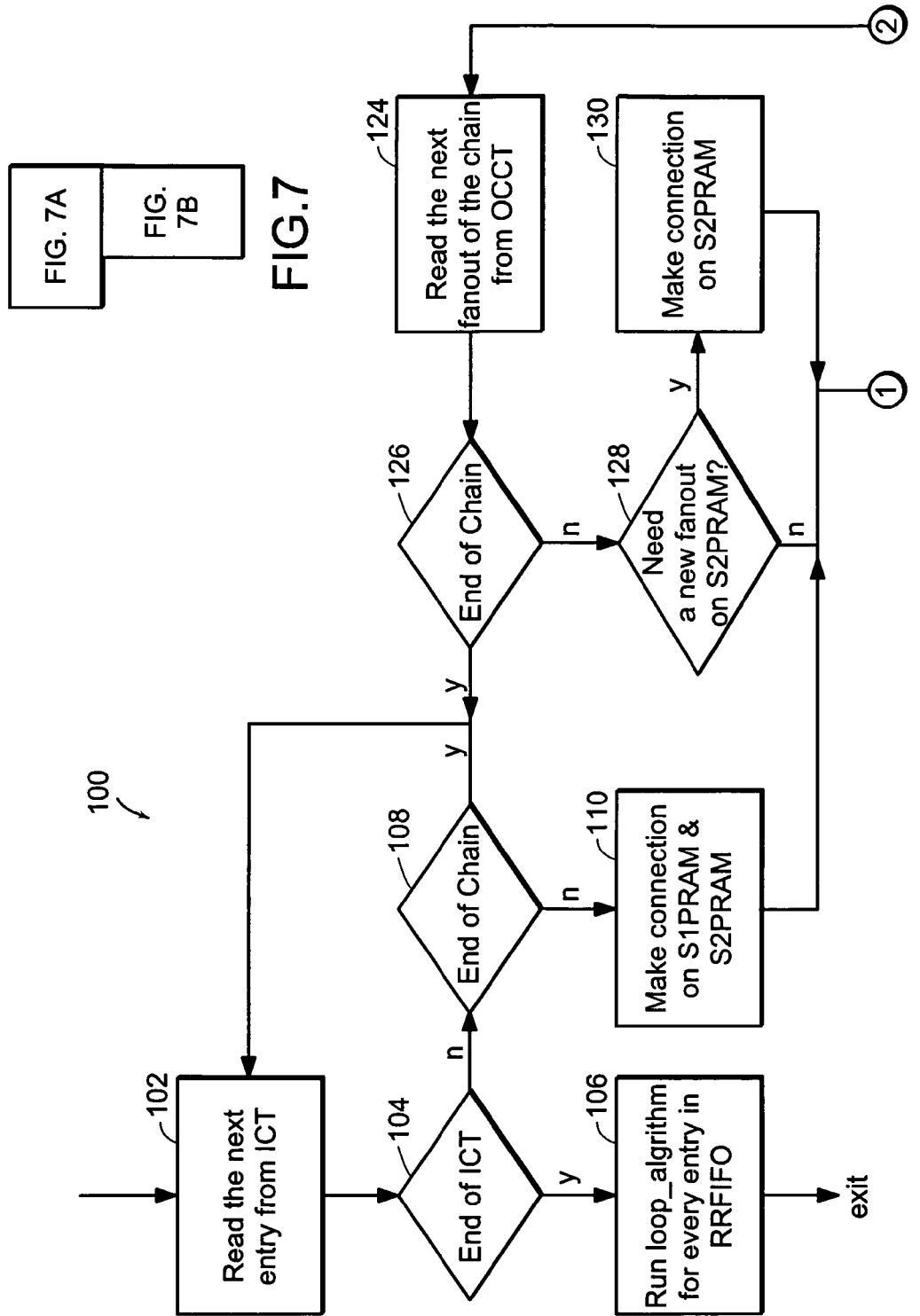

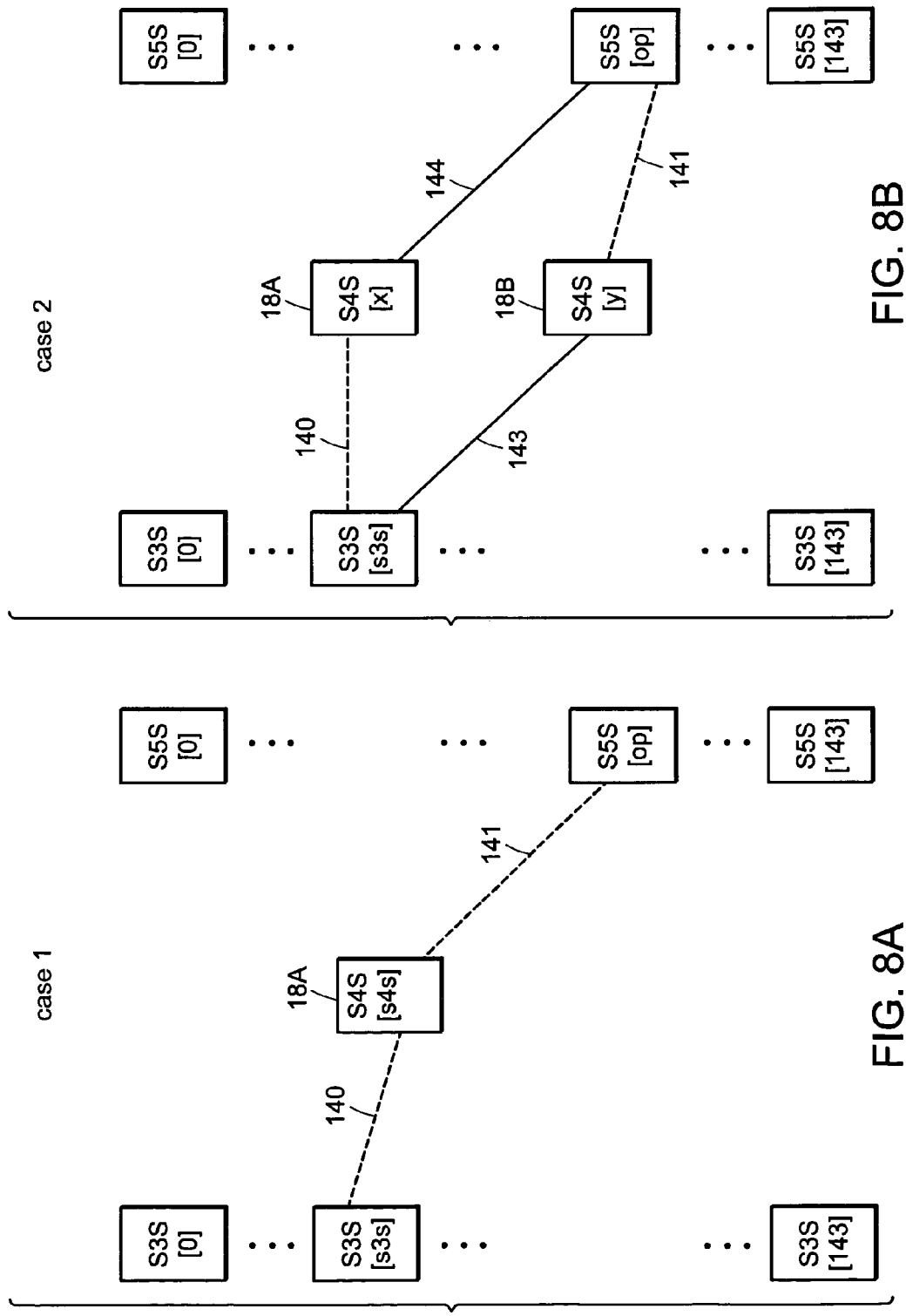

GROOMING SWITCH HARDWARE SCHEDULER

RELATED APPLICATIONS

This application claims the benefit of U.S. Provisional Application No. 60/432,694, filed on Dec. 11, 2002.

The entire teachings of the above applications are incorporated herein by reference.

BACKGROUND OF THE INVENTION

FIG. 1 is a schematic diagram of a five-stage Clos switching network 10.

In the pictured embodiment, there are 144 space inputs, one to each time switch slice 12 of stage 1. Each space input has 48 timeslots, illustrated as separate parallel inputs to the time switch slices 12, for a total of 6,912 input timeslots. Similarly, there are 6,912 output timeslots.

Stages 1, 3 and 5 are timeslot interchange stages. Each of these stages has 144 time switch slices 12, each of which has 48 inputs and 48 outputs. Stages 2 and 4 are space switch stages. Each has 48 space switch slices 14 and each space switch slice 14 has 144 inputs and 144 outputs.

In stage 1, the 48 time slots for each of the 144 inputs are rearranged, and perhaps duplicated, and forwarded to appropriate ones of the space switches in stage 2. Specifically, data placed in timeslot [0] at each time switch slice 12 is forwarded to switch 14[0] in stage 2. All timeslots [1] are forwarded to switch 14[1], and so on.

In stage 2, space switch slice 14[0] directs each of the 144 [0] timeslots to an appropriate one of 144 time switch slices in stage 3, space switch slice 14[1] directs all of the [1] timeslots, and so on.

Subsequent stages perform similarly. For simplicity, only representative interconnects between switch stages are shown.

Stages 1 and 2 operate together as a concentrator. Stage 3 performs copy distribution. Stage 3, 4 and 5 function collectively as a rearrangeably non-blocking unicast Clos network. A unicast hardware scheduler arranges all connection calls from input timeslots to output timeslots.

SUMMARY OF THE INVENTION

A fast hardware scheduler embodying the present invention can be used in conjunction with the grooming switch of FIG. 1.

As described in U.S. Ser. No. 10/114,398, "Non-Blocking Grooming Switch," filed on Apr. 1, 2002 and incorporated herein by reference, this five-stage Clos network can be rearrangeably non-blocking for arbitrary fanout.

One embodiment of the present invention hardware scheduler can be implemented, for example, in a 144×144 five-stage grooming switch to support rearrangeably non-blocking for arbitrary fanout at STS-1 granularity, i.e., 6912×6912.

An embodiment of the present invention hardware scheduler includes various data structures. In particular, RRFIFO, xRAM and yRAM data structures are implemented to reduce overall scheduling time. The hardware scheduler accumulates all rearrangeable requests, for example, into a buffer before serving the requests. This buffer may be, for example, a first-in, first-out buffer, and is referred to hereafter as the RRFIFO, although one skilled in the art would recognize that the buffer need not be restricted to first-in, first-out. The hardware scheduler then serves the buffered requests together in the pipeline, at a designated time, such as when the buffer is full. The xRAM and yRAM data structures allow the hardware scheduler to process two looping steps within one clock period.

Accordingly, a switching method for a grooming switch having at least three switching stages comprising first, middle and last switch stages, for example, stages 3, 4 and 5 respectively of the Clos network of FIG. 1, includes accumulating a list of connection requests that cannot be granted given currently scheduled connection assignments. Each request designates an input of the first switch stage and an output of the last switch stage which are to be connected. At a designated time, for each request in the list, two data structures are dynamically built.

The first data structure (xRAM) records, for each output of a first switch slice of the middle stage, a configured input of the first switch slice that is currently assigned to said output. That is, the xRAM structure records which input is currently assigned to each output.

The second data structure (yRAM) records, for each of the same outputs (i.e., for each output of the first switch slice of the middle stage), the output of a second switch slice of the middle stage that is connected to an input of the second switch slice corresponding to the configured input of the first switch slice.

In other words, for some middle stage slice output, the xRAM gives the input (of the same stage slice) that is currently scheduled to be connected to that output. For the same output, the yRAM gives another output on another slice (of the middle stage) that is currently scheduled to be connected to a like-numbered input on the respective slice. These xRAM and yRAM structures thus provide a fast lookup, enabling fast switching of scheduled connections during the looping algorithm. Finally, connections are assigned, as scheduled, to satisfy the stored unassigned requests, by reassigning existing connection assignments using the xRAM and yRAM data structures.

The designated time may be, for example, when the list holds a predetermined number of requests, or when all requests have been examined.

The list itself may be maintained in, for example, a first-in, first-out (FIFO) buffer.

At least one embodiment of the present invention includes multiple sets of xRAM/yRAM pairs. A scheduling engine can then schedule one connection using a first set of xRAM/yRAM, while a second set of xRAM/yRAM is being dynamically built to schedule a second connection.

Preferably, hardware maintains the list, dynamically builds the xRAM and yRAM data structures, and performs all scheduling functions.

Embodiments of the present invention may support dual frame alignment.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 8A and 8B are block diagrams illustrating two cases which occur in the present invention.

DETAILED DESCRIPTION OF THE INVENTION

A description of preferred embodiments of the invention follows.

Figure 2B:
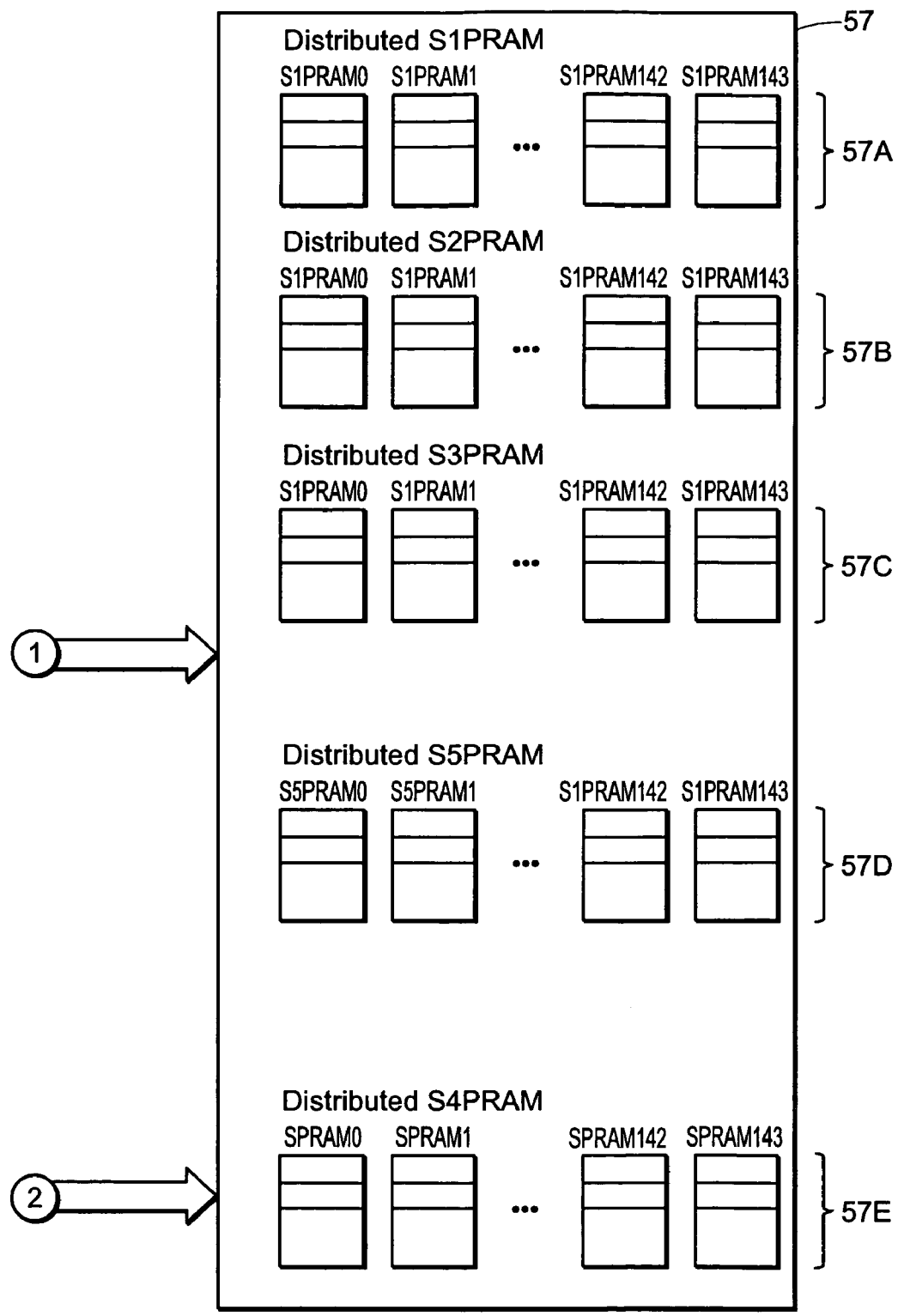
FIG. 2 is a block diagram of an embodiment of the hardware scheduler of the present invention, illustrating several data structures used by the hardware scheduler.

FIG. 2 is a block diagram of an embodiment of the present invention hardware scheduler, illustrating several data structures used by the hardware scheduler.

Figure 1:
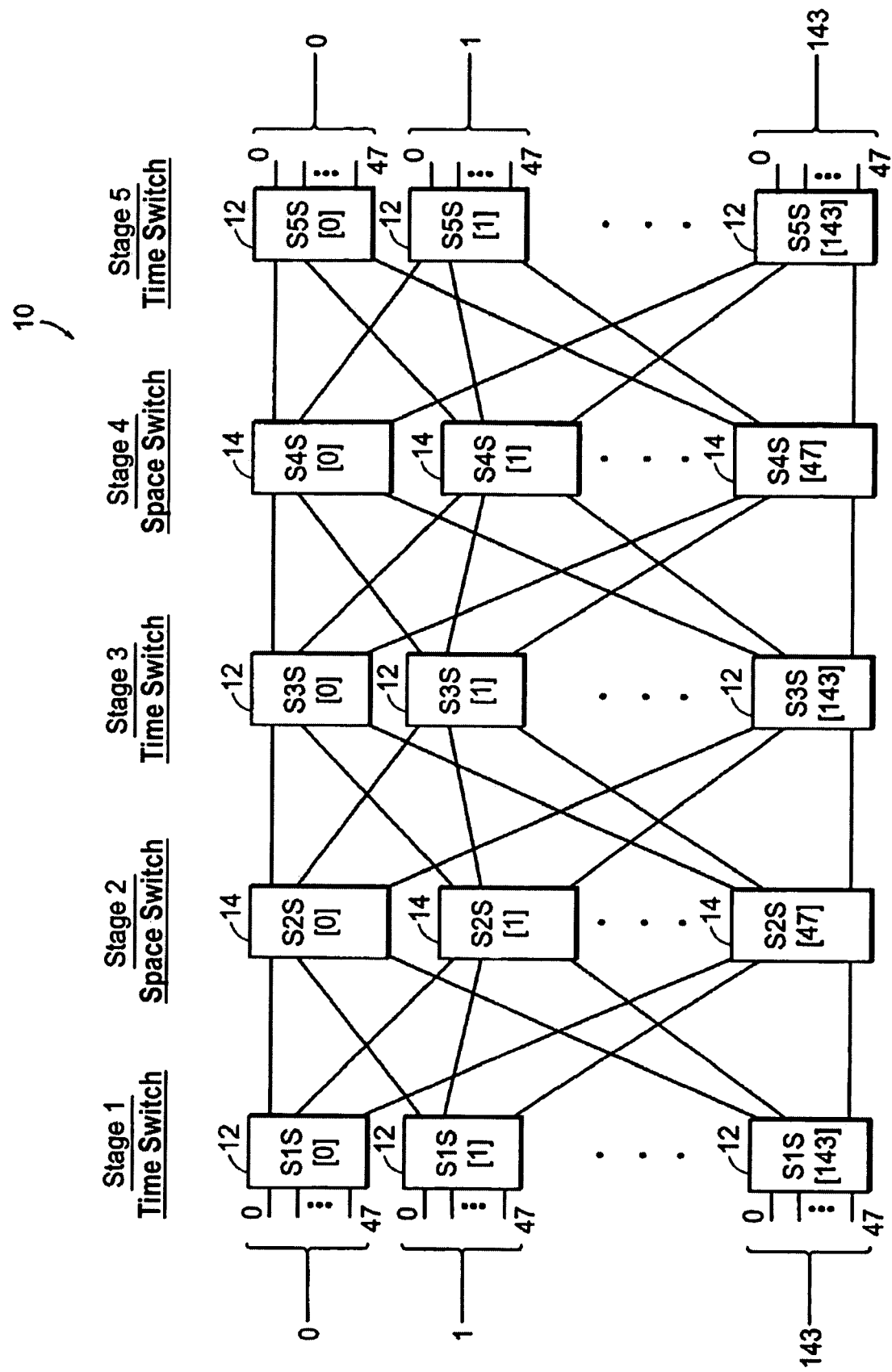
FIG. 1 is a schematic diagram of a five-stage Clos switching network.

The hardware scheduler 40 includes a scheduling engine 45 that schedules connections within the switch 10 (FIG. 1), using various data structures. Each of these data structures is described in more detail below.

Output Connection Table (OCT) 33

The OCT 33 records, for each of the 6,912 output timeslots (FIG. 1), which input timeslot has requested to connect to that output timeslot. In one embodiment of the present invention, the OCT 33 is implemented as a single-port 6,912×15 static RAM (SRAM). Alternatively, the OCT 33 could be implemented, for example, as two single-port 3,456×15 SRAMs.

Thirteen address lines encode the absolute output timeslot number (0-6,911). In one embodiment, data stored in the OCT 33 contains information as described in Table 1:

TABLE 1

| data | value range | definition |
|---|---|---|
| bit[14] | 0~1 | Frame Alignment A("0") or B("1") |
| bit[13:6] | 0-143 | input port number |
| | 144-255 | reserved |
| bit[5:0] | 0-47 | connected input timeslot |
| | 59 | AISP |
| | 60-63 | Unequipped 0-3 |
| | Other | Reserved |

After a reset or master disconnection, bit[14] of each OCT entry is set to the value defined by the Frame Alignment A/B registers and bit[13:0] is set to the unequipped format. Note that AISP and Unequipped 0-3 are special SONET data formats.

Input Connection Table (ICT) 49

The ICT 49 is preferably 6,922×15 bits. The first 6,912 entries record, for each of the 6,912 input timeslots (FIG. 1), which output timeslot has been requested to connect to that input timeslot. An unconnected input timeslot is denoted by a value of all ones, e.g., 255 (=0×FF). If multiple fanouts have been requested for an input timeslot, then the ICT 49 records only one of the requested output timeslots.

In the first 6,912 entries, thirteen address lines encode the absolute input timeslot number (0-6,911).

Although the switch has 6,912 input timeslots and 6,912 output timeslots, in an actual application, not all 6,912 output timeslots may be connected to input timeslots. For example, only half of the output timeslots may be used, while the other half is reserved for future expansion. Thus, some output timeslots do not connect to any input timeslots. The SONET standard nevertheless requires those unconnected output timeslots to transmit data streams in unequipped formats. An output timeslot transmits a data stream in AISP format if the input timeslot to which it is connected is broken. Therefore, chains must be built for those special output timeslots. For this reason, the last ten entries of the ICT 49 are reserved for unequipped or AISP timeslots. Table 2 illustrates ICT entry assignment, while Table 3 illustrates the ICT data definition.

TABLE 2

| entry | assignment |
|---|---|
| 0~6911 | S1.I(0)~S1.I(6911) |
| 6912~6915 | unequipped0-3 in the Frame Alignment domain A |
| 6916~6919 | unequipped0-3 in the Frame Alignment domain B |
| 6920 | AISP in the Frame Alignment domain A |
| 6921 | AISP in the Frame Alignment domain B |

TABLE 3

| data | value range | definition |
|---|---|---|
| bit[14] | 0~1 | Frame Alignment A("0") or B("1") |
| bit[13:6] | 0~143 | output port number |
| | 144~255 | reserved |
| bit[5:0] | 0~47 | connected output timeslot |
| | 48~63 | reserved |

Before whole-chip re-configuration, the hardware scheduler resets each ICT entry to all ones.

Output Connection Chain Table (OCCT) 51

The Output Connection Chain Table (OCCT) 51, preferably 6,912×14 bits, is used to accommodate multicast connections. For each of 6,912 output timeslots, the OCCT 51 records another output timeslot to which connection to the same input timeslot has been requested. The OCCT 51 is thus organized as a one-way linked chain. That is, all output timeslots requesting to connect to the same input timeslot are linked together. Except for the ending node, each output timeslot in a chain has a link to the next output timeslot.

The starting node of each such chain is pointed to by the ICT 49. The ending node is denoted, in the OCCT 51, by a special value, e.g., all ones.

Before whole-chip re-configuration, all entries of the OCCT 51 are reset to all ones.

Figure 3:
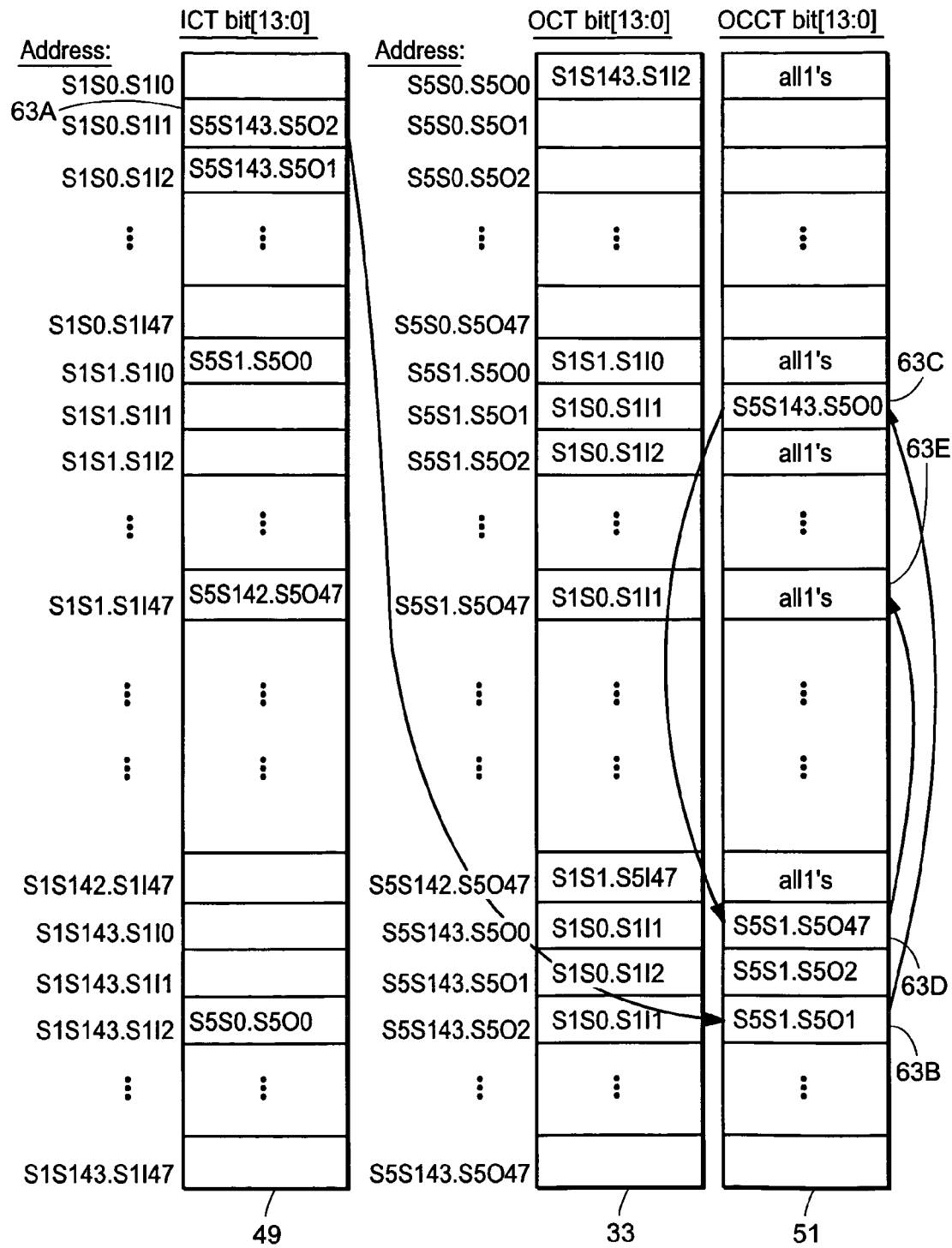
FIG. 3 is a schematic diagram illustrating the OCT, the ICT and the OCCT in a 144×144 grooming switch.

FIG. 3 is a schematic diagram illustrating the OCT 33, the ICT 49 and the OCCT 51 in a 144×144 grooming switch. Using the nomenclature SnS[m].I/O(j) (abbreviated from SnSm.SnI/Oj as used in FIG. 3) to designate input/output j of stage n, slice m, the configuration shown in this example has the following multicasting connections:

S1S[0].I(1)→S5S[143].O(2), S5[1].O(1), S5[143].O(0), S5[1].O(47) (shaded)
S1S[0].I(2)→S5S[143].O(1), S5[1].O(2)
S1S[1].I(0)→S5S[1].O(0)
S1S[1].I(47)→S5S[142].O(47)
S1S[143].I(2)→S5S[0].O(0)

For example, entry 63A in the ICT 49, indicates that, as requested, the input time slot at stage 1 slice 0 input 1, S1S[0].I(1), should be connected to stage 5 slice 143 output number 2. Entry 63B in the OCCT 51 indicates that the same input, i.e., S1S[0].I(1), is to be connected to stage 5 slice 1 output 1. The same input should also be connected to stage 5 slice 143 output 0 and stage 5 slice 1 output 47, as indicated by entries 63C and 63D respectively within the OCCT 51. Finally, entry 63E in the OCCT 51, corresponding to the last output in the chain, stage 5 slice 1 output 47, is all ones, indicating the end of the multicast chain.

Stage-4 Input Free Slot Vector (IFSV) 43 and Output Free Slot Vector (OFSV) 41

The IFSV 43 and OFSV 41 are each 144×48-bit. Each may be implemented, for example, as a dual-port SRAM with 48-bit data and eight address lines.

Figures 4, 4A, 4B:
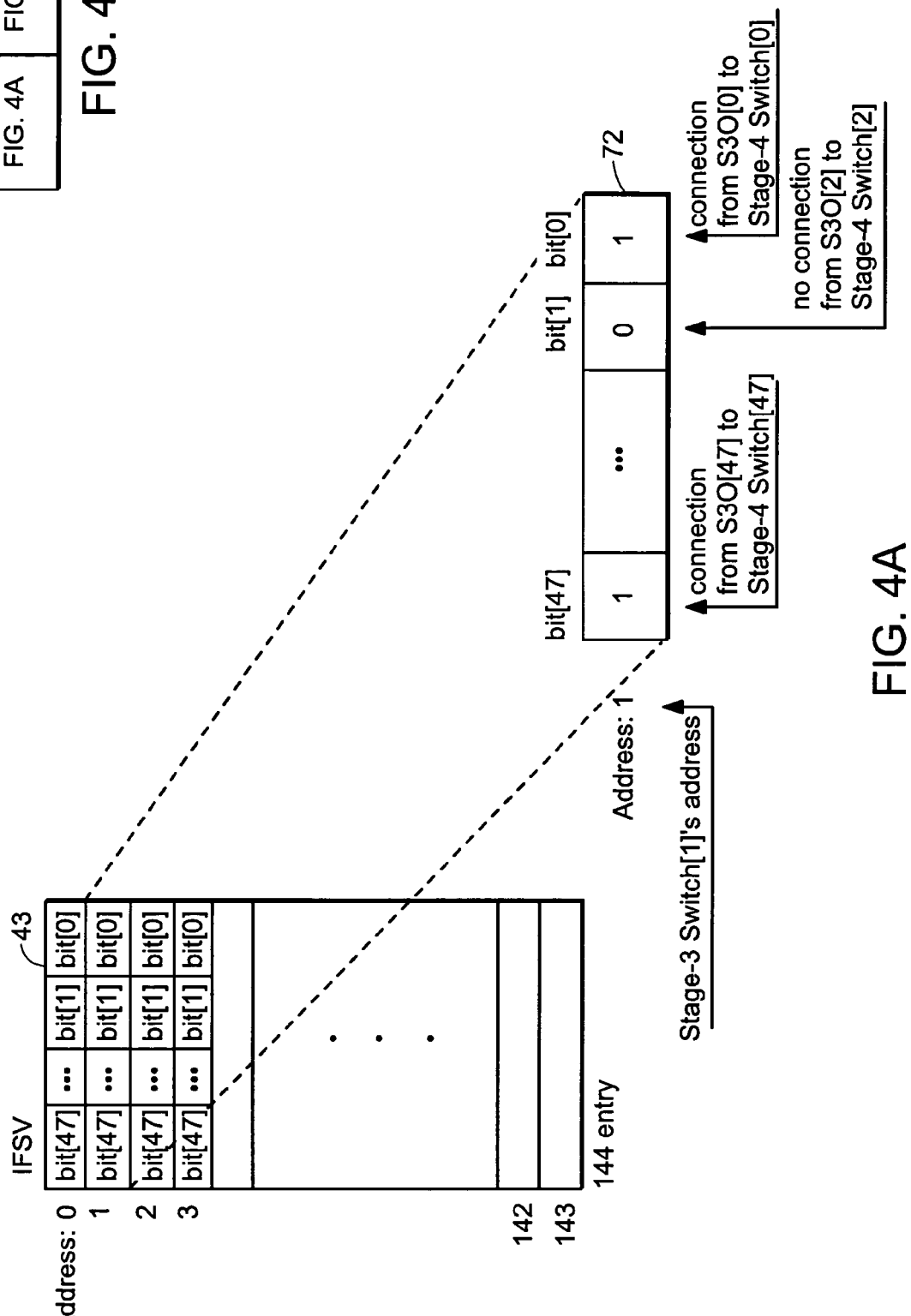
FIG. 4 illustrates the structure of a preferred IFSV.
Figure 4B:
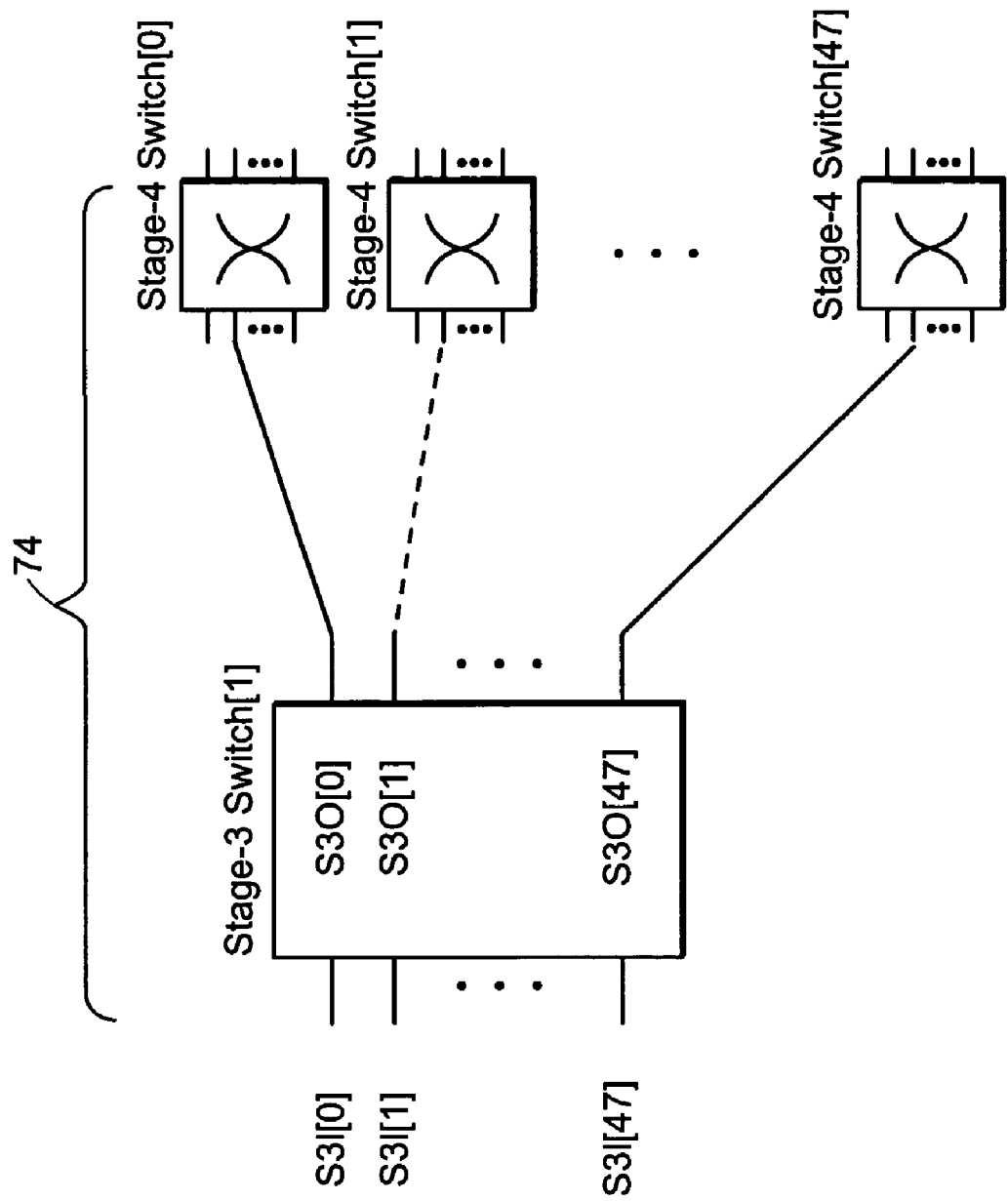

FIG. 4 illustrates the structure of the IFSV 43 in a preferred embodiment. In the IFSV 43, each 48-bit row corresponds with a stage 3 switch slice.

For example, row 1 (address 1) of the IFSV 43, shown expanded at 72, is associated with slice 1 of stage 3 (S3S[1]). Each bit in the row 72 indicates the status of a particular output of stage 3 (i.e., whether it is free or assigned). It follows then that each bit also indicates whether the stage 4 switch slice connected to that stage 3 output is free or assigned (busy).

For example, in the example switch configuration at 74, stage 3 slice 1 (S3S[1] outputs 0 and 47 (i.e., S3S[1].O(0) and S3S[1].O(47) respectively) have been assigned (i.e., they are busy), so that bit[0] and bit[47] in the expanded IFSV row 72 each have the value "1", while stage 3 slice 1 output 1 (S3S[1].O(1)) is not assigned, so that bit[1] in the same row 72 has the value "0".

The OFSV 41 (FIG. 2) has a similar data structure. In the OFSV 41, the 48-bit data indicate, for each stage 5 switch slice, which stage 4 switch slices are free and which are busy. The 8-bit address is an encoded stage 3/stage 5 switch slice number (0 to 143).

Preferably, the IFSV 43 and OFSV 41 are each memory-mapped and can be accessed directly when hardware scheduling is off.

S1PRAM/S2PRAM/S3PRAM/S4PRAM/S5PRAM

The SnPRAMs 57 indicate the assigned through-connections for each stage of the grooming switch. The switch configuration is complete once all of the connection assignments have been written into the SnPRAMs. Preferably, there are 144 of each of the S1PRAM, S2PRAM, S3PRAM, S4PRAM and S5PRAM.

Each S1PRAM 57A records, for each of the 48 outputs of a stage-1 switch slice, which stage-1 input (0-47) is connected to that output.

Each S2PRAM 57B records, for each of the 48 inputs of a stage-3 switch slice, which stage-2 input (0-143) is connected to that stage-3 input.

Each S3PRAM 57C records, for each of the 48 outputs of a stage-3 switch slice, which stage-3 input (0-47) is connected to that output.

Each S4PRAM 57E records, for each of the 48 inputs of a stage-5 switch slice, which stage-4 input (0-143) is connected to that stage-5 input.

Each S5PRAM 57D records, for each of the 48 inputs of a stage-5 switch slice, which stage-5 output (0-47) is connected to that stage-5 input.

Because, in a preferred embodiment, an SPRAM address encodes an absolute output timeslot number (0-6,911) and the linker data is defined as separate port and timeslot number, an address translator is implemented to convert linker to absolute address. The translator is implemented as a substructure:

Absolute Address[13:0]=Data[13:0]−{Data[13:6], 0000}

Rearrangeable Request FIFO (RRFIFO) 47

The RRFIFO 47 is a 16-entry×28-bit FIFO RAM. It accumulates requests that cannot be serviced without rearranging the switch configuration for performance enhancement. The RRFIFO 47 has a single read/write port, operating, for example, at 311 MHz. The RAM has flip-flops on both inputs and outputs. Back-to-back read cycles are supported.

Table 4 describes the ports of the RRFIFO 47.

TABLE 4

| Port name | Description |
| --- | --- |
| CLK | read/write clock |
| DI(27:0] | write data input |
| ADR[3:0] | read/write address |
| WE | write enable |
| DOUT[27:0] | read data output |
| ME | memory enable. When it is 0, RAM is power down, data output r_DATA[31:0] is all 1's. |

Stage 4 Switch Connection RAM (xRAM) 55

The xRAM 55 is a 144×8 bit structure. It records, for each of the 144 outputs of some slice x of stage 4, i.e., S4S[x], which input is connected to that output. An unconnected output may be denoted by, for example, all ones, (e.g., 255). Here, "x" represents a first switch slice (slice x) of stage 4, while "y" represents a second switch slice (slice y) of stage 4.

The xRAM 55 is implemented as a 144×1 byte SRAM with a one read/write (r/w) address port and one write address port. The read/write address is organized as the encoded output number (0-143).

The algorithm guarantees that a simultaneous read/write to the same byte location cannot occur.

Sorted Stage 4 Switch Connection RAM (yRAM) 53

The yRAM 53 is a 144×8 bit. It records, for each of the 144 outputs of the first stage 4 switch slice, S4S[x], which output (0-143) of a second stage 4 slice, S4S[y], is connected to the same input number to which that output of S4S[x] is connected. An unconnected output may be denoted by a value of 255.

Like the xRAM 55, the yRAM 53 is implemented as a 144×1 byte SRAM with one r/w address port and one write address port. Each address is the encoded S4S[x] output number (0-143). The algorithm guarantees that a simultaneous read from or write to the same byte location cannot occur.

The xRAM 55 and yRAM 53 are dynamic structures. They are loaded based on the contents of S4PRAM 57E, when the looping algorithm is executed to reconfigure the switch in order to service a request.

In one embodiment, the hardware scheduler has two xRAMs (55A, 55B) and two yRAMs (53A, 53B), allowing one set of xRAM/yRAM to schedule a connection while the other set is loading data from S4PRAM 57E.

Figure 5A:
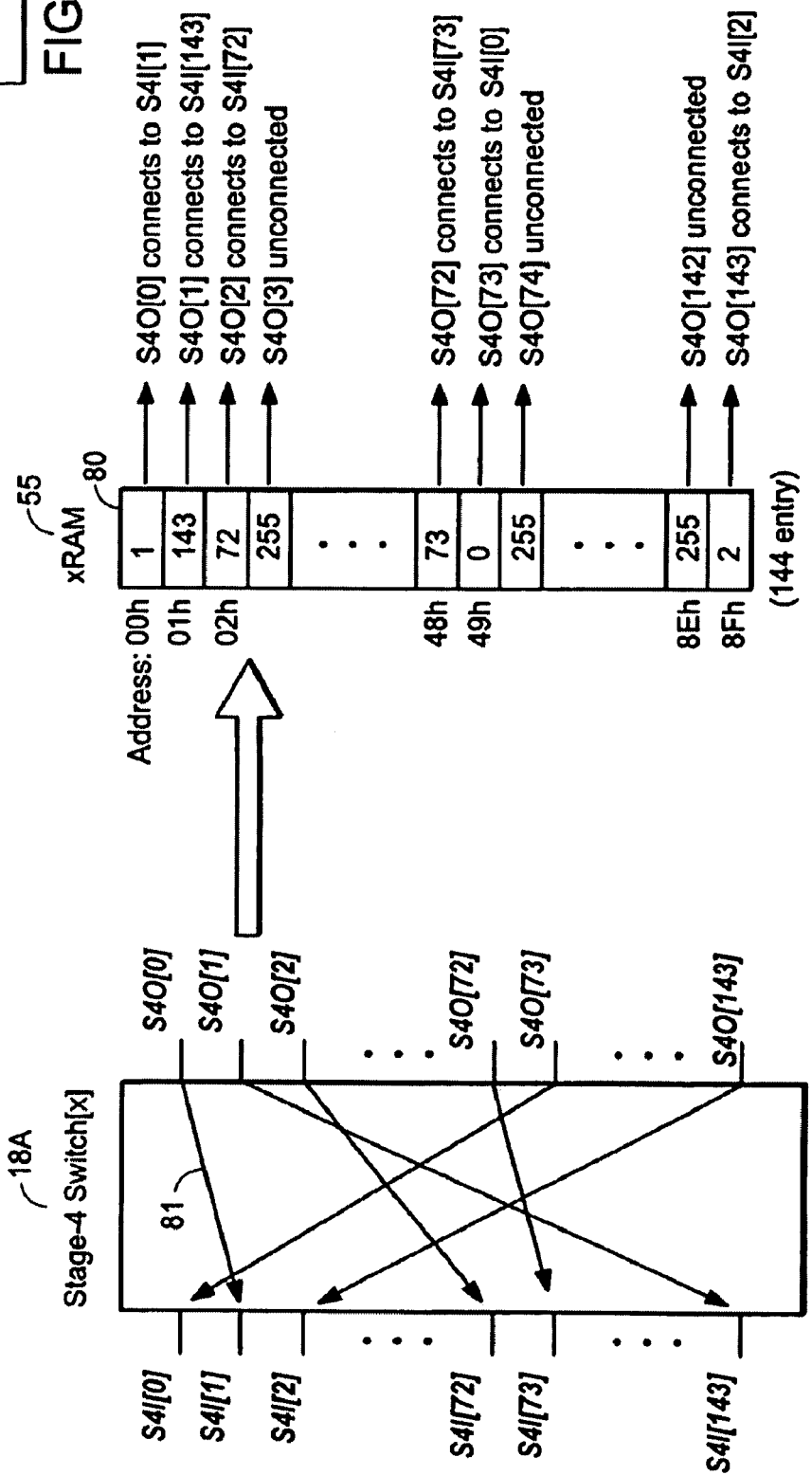
FIG. 5 is a schematic diagram illustrating the structures of one pair of xRAM and yRAM.
Figure 5B:
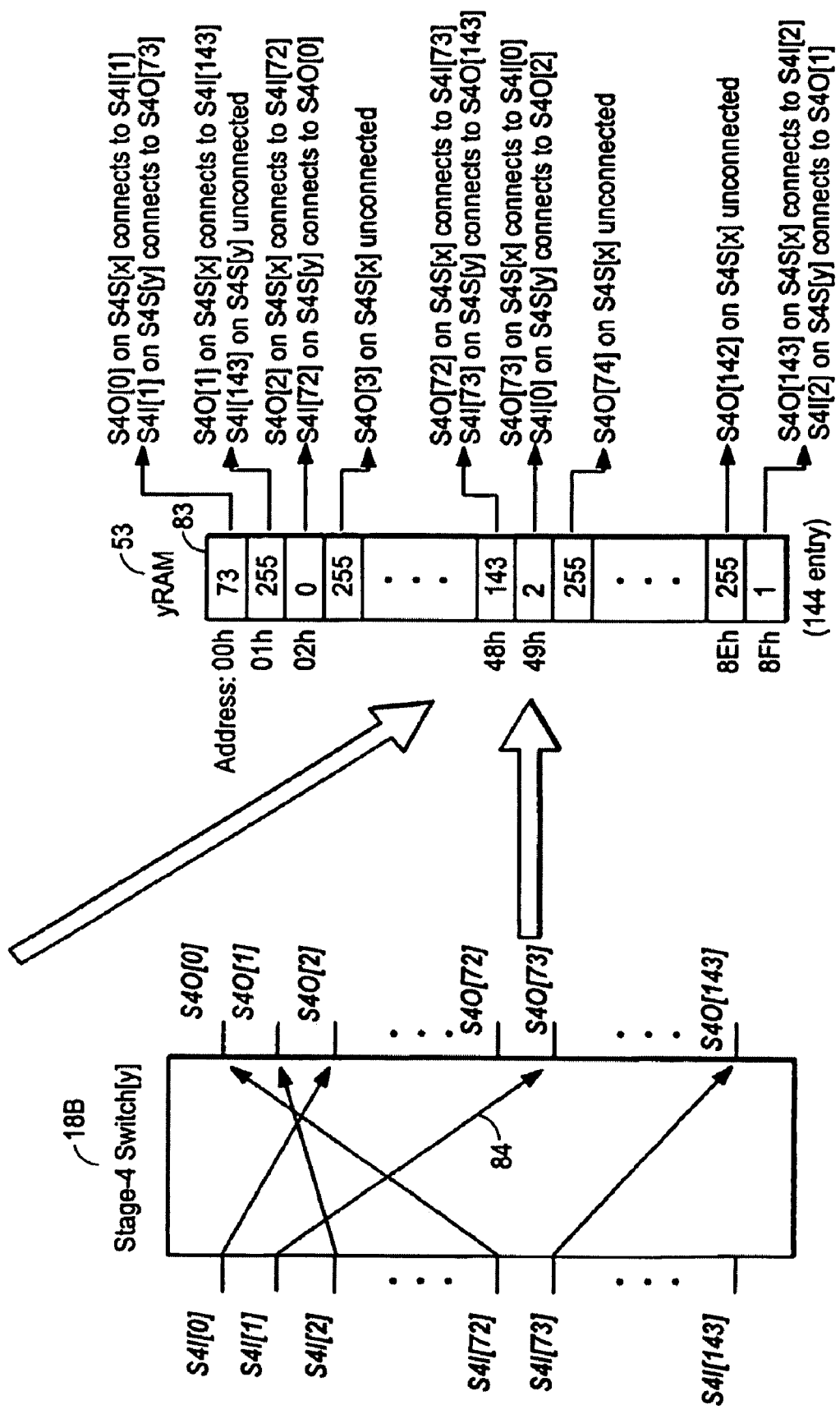

FIG. 5 is a schematic diagram illustrating the structures of one pair of xRAM 55 and yRAM 53. In the example shown, entry 80 of the xRAM 55 at address 00 indicates that output S4S[x].O(0) is connected to input S4S[x].I(1). This connection is illustrated as line 81, in stage 4 switch slice x (S4S[x]) 18A. Similarly, each entry in the xRAM 55 indicates, for S4S[x], which output is indicated to which input. Unconnected outputs in this case have the value 255, i.e., all ones.

The yRAM 53, on the other hand, indicates which outputs on another stage 4 switch slice (S4S[y]) are available for the connected input. For example, entry 83 in the yRAM 53 indicates that both S4S[x].O(0) and S4S[y].O(73) are both connected to a common input number (and thus a common stage 3 slice). By referencing the xRAM 55, it can be seen that S4S[x].O(0) is connected to S4S[x].I(1). Thus, by implication, S4S[y].O(73) is connected to S4S[y].I(1). (This connection is shown as line 84 at 18B.)

Thus the xRAM 55 and yRAM 53 together quickly provide alternate paths through stage 4 for routing.

Functional Description

Figure 6:
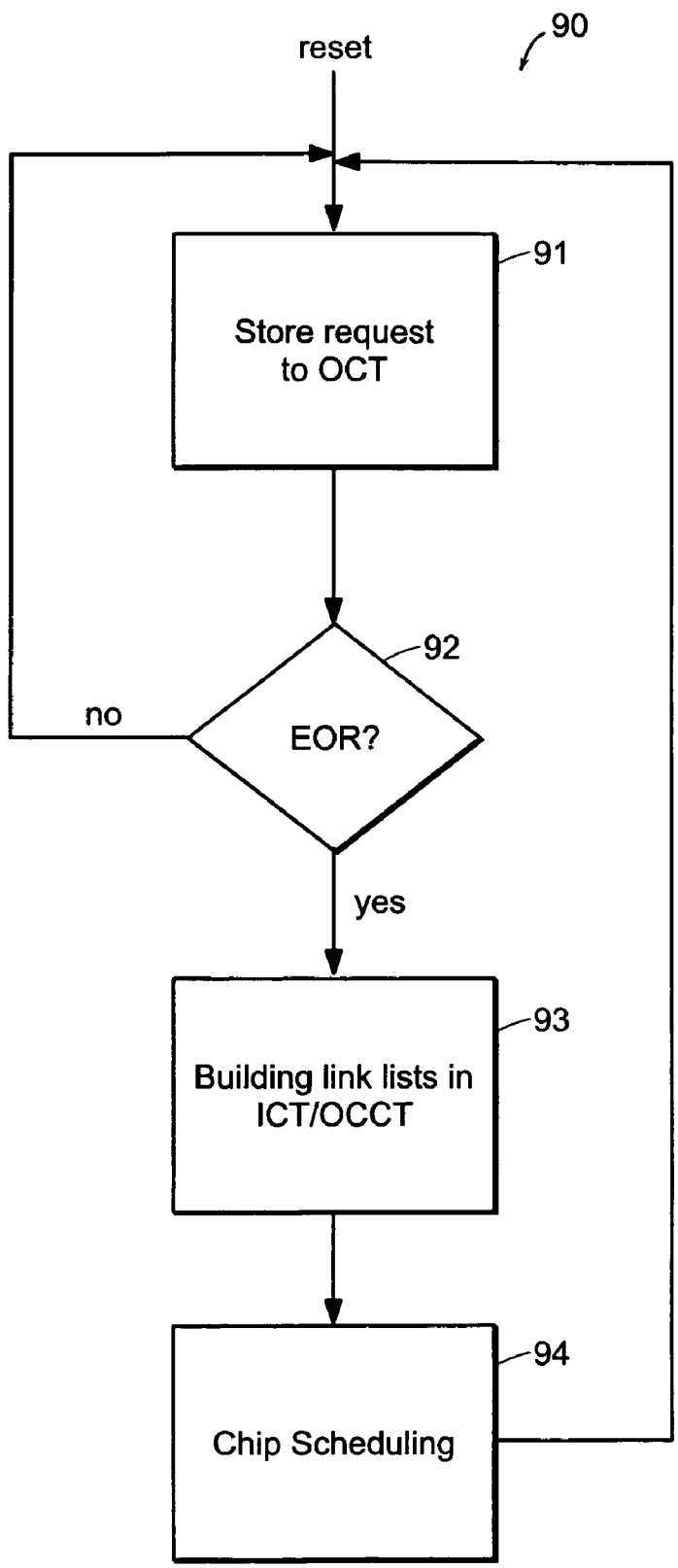
FIG. 6 is a flowchart illustrating operation of an embodiment of the hardware scheduler of the present invention at a top level.

FIG. 6 is a flowchart 90 illustrating operation of an embodiment of the hardware scheduler of the present invention at a top level.

At step 91, the scheduler receives requests and stores them into the OCT 33 (FIG. 2), until, at step 92, an End Of Request (EOR) is detected. Once an EOR is detected, the scheduler builds a link list in the ICT 49 and OCCT 51 (step 93). Finally, at step 94, the hardware scheduler reads the link chains one by one and schedules them by writing them into the SnPRAMs 57.

Building the link list in ICT/OCCT

The following pseudo code describes building the ICT/OCCT linked list.

```
// build a link list from OCT into ICT/OCCT
    // initialize the ICT
    // ip = input port; its = input time slot
    // op = output port; ots = output time slot
    Initialize every entry in the ICT to all ones
    (including Unequipped AISP entries)
    // build the list
    for (op =0, op<= 143, op = op +1)
        begin
            For (ots =0, ots<= 47, ots = ots +1)
                begin
                    ip.its[13:0] = OCT[op.ots][13:0];
                    frame_domain = OCT[op.ots][14];
                    if (ip.its = = unequipped or ip.its = = AIS-P)
                        ip.its[5:0] = unequipped/AISP address;
                    c_bptr[13:0] = ICT[ip.its][13:0];
                    OCCT[op.ots] = c_bptr;
                    ICT[ip.its][13:0] = op.ots;
                    ICT[ip.its][14] = frame_domain;
                end
        end
```

Chip Scheduling

After building the linked list, the hardware scheduler reads the sorted connection data from the ICT 49 and OCCT 51, and makes the connection by writing to the SPRAMs 57. As discussed previously, stages 1 and 2 function as a concentrator, and stage 3 performs copy distribution. Stage 3, 4 and 5 function as a rearrangeably non-blocking unicast Clos network. The present invention unicast hardware scheduler arranges all connection calls from stage 3 to stage 5.

Figure 7B:
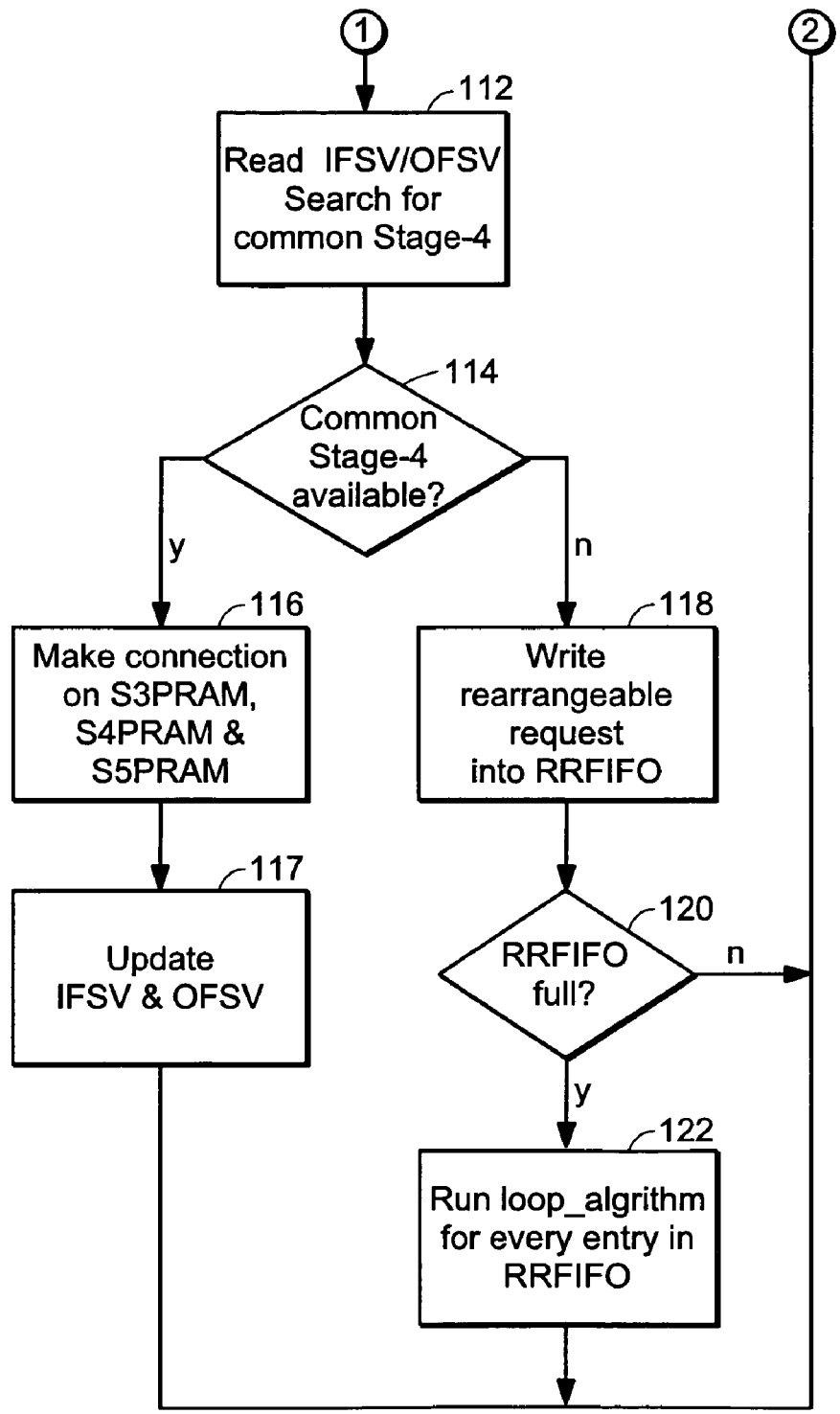
FIG. 7 is a flowchart of the chip-scheduling algorithm of FIG. 6.

FIG. 7 is a flowchart 100 of the chip-scheduling algorithm, corresponding to block 94 of FIG. 6, of an embodiment of the present invention.

First, at step 102 an entry from the ICT 49 is read. If there are no more entries, as determined at step 104, then the loop algorithm is executed at step 106 for every entry in the RRFIFO 47, after which the chip scheduling algorithm 100 terminates. The loop algorithm is described in more detail further below.

If, on the other hand, the end of the ICT is not detected at step 104, then step 108 determines whether the end of a chain in the ICT has been detected. If so, then the next entry from the ICT is read, again at step 102. If, on the other hand, the end of the chain is not detected, then at step 110, connections are made on the appropriate S1PRAM 57A and S2PRAM 57B according to some concentrator algorithm. Thus, for this entry, the input time slot has been routed through stages 1 and 2 to a particular input of a particular stage 3 slice.

At step 112, the input and output free slot vectors, 43 and 41 respectively, are searched to determine whether a common stage 4 slice exists for the requested connection's stage 3 input and stage 5 output. If such a common stage 4 connection is available, as determined at step 114, then at step 116 that connection is made by writing to the S3PRAM 57C, S4PRAM 57E and S5PRAM 57D, and the IFSV 43 and OSFV 41 are updated accordingly (step 117).

If, on the other hand, no common stage 4 connection is available, then the request is written to the RRFIFO at step 118. At step 120 a determination is made as to whether the RRFIFO is full. If it is full, then at step 122 the loop algorithm is executed for every entry in the RRFIFO.

After the loop algorithm completes, in step 122, or if the RRFIFO was not full at step 120, then the next fanout of the chain from the OCCT 51 is read at step 124. If at step 126 the end of a chain is detected, then execution returns to step 102 and the next entry is read from the ICT 49. If, on the other hand, an end of chain is not detected, then at step 128 a determination is made as to whether a new fanout is needed on the S2PRAM. If so, the connection is made on the S2PRAM at step 130. In either case however, execution proceeds to step 112 as previously described.

The following pseudo code describes the scheduling function. Where appropriate, step numbers corresponding to the flowchart 100 of FIG. 7 are listed.

In one embodiment, the hardware scheduler supports dual frame alignment so that the grooming switch can be partitioned into two independent grooming switches. To support two distinct frame alignment domains, two sets of stage-2/stage-3 counters are used in the algorithm below, one set for each domain. The counter of the frame alignment domain A counts from top to bottom. The counter of the frame alignment domain B counts from bottom to top. The Unequipped/AISP output timeslot (OTS) is scheduled as a regular connection.

```
// 5 stages connection
s3o_counter_a = 0;
s3s_a = 0;
s2s_a = 0;
s3o_counter_b = 0;
s3s_b = 143;
s2s_b = 47;
For (ip =0, ip<= 144, ip = ip +1)
      begin
            For (its =0, its<= 47, its = its +1)
                  begin
                        if (ip = = 144 and its = = 10)              // step 104
                              begin
                                    loop_algrithm(every valid entry in RRFIFO);  // step 106
                                    exit;
                              end
                        if (ICT[ip.its] != all 1's)
                              begin       // make connection
                                    read frame_domain from ICT[ip][14];
                                    read fanout (op.ots) from ICT[ip][13:0];
                                    if (frame_domain = = 0)
                                          begin       // Frame Domain A
                                                s3o_counter = s3o_counter_a;
                                                s2s = s2s_a;
                                                s3s = s3s_a;
                                                s2s_a = (s2s_a + 1) % 48;
                                          end
                                    else
                                          begin       // Frame Domain B
                                                s3o_counter = s3o_counter_b;
                                                s2s = s2s_b;
                                                s3s = s3s_b;
                                                s2s_b = (s2s_b − 1) % 48;
                                          end
                                    if (ip != 144)
                                          begin       // step 110
                                                write "its" to S1PRAM_ip[s2s];
                                                write "ip" to S2PRAM_s3s[s2s];
                                                s3i = s2s;
                                                write frame_domain to s2s/s3s;
                                          end
                                    else
                                          begin
                                                s3i = Unequipped/AISP code;
                                                write frame_domain to s3s;
                                          end
                                    while (not the end of the chain)
                                          begin
                                                search for common free slot com_s4s;       // step 112
                                                if (com_s4s = = null)       // step 114
                                                      // no common Stage-4 switch (Fig. 8B)
                                                      write (s3s.s3i, op.ots) into RRFIFO;       // step 118
                                                else
                                                      begin
                                                            // common Stage-4 switch (Fig. 8A)       // step 116
                                                            write s3i to S3PRAM_s3s[com_s4s];
                                                            write s3s to S4PRAM_op[com_s4s];
                                                            write ots to S5PRAM_op[com_s4s];
                                                            update IFSV & OFSV;       // step 117
                                                      end
                                                if (frame_domain = = 0)
                                                      begin       // Frame Domain A
                                                            s3o_counter_a = (s3o_counter_a + 1) % 48;
                                                            if (s3o_counter_a = = 0)
                                                                  s3s_a = s3s_a + 1;
                                                            s3o_counter = s3o_counter_a;
                                                            s3s = s3s_a;
                                                      end
                                                else
                                                      begin       // Frame Domain B
                                                            s3o_counter_b = (s3o_counter_b + 1) % 48;
                                                            if (s3o_counter_b = = 0)
                                                                  s3s_b = s3s_b − 1;
                                                            s3o_counter = s3o_counter_b;
                                                            s3s = s3s_b;
                                                      end
                                                if (RRFIFO full)       //step 120
                                                      loop_algrithm(every entry of RRFIFO);       // step 122
                                                read the next fanout (op.ots) from OCCT;       // step 124
```

-continued

```
                if (not the end of the chain)              // step 126
                  begin
                    if (s3o_counter = = 0 and ip != 144)    // step 128
                      begin
                        write "ip" to S2PRAM_s3s[s2s]       // step 130
                        write frame_domain to s2s/s3s;
                      end
                    else if (s3o_counter = = 0 and ip = = 144)
                      write frame_domain to s3s;
                  end
              end
            end
          end
        end
```

FIGS. 8A and 8B are block diagrams illustrating the two cases as described in the above pseudocode.

In case 1 (FIG. 8A), a common stage-4 switch 18A exists for the requesting input and output 140, 141 respectively. Therefore, the connection can be made immediately.

In case 2 (FIG. 8B), the connection cannot be made immediately in either of two switch-4 slices 18A, 18B, because a connection 144 has already exists between stage 4 slice 18A and stage 5 slice op, and another connection 143 already exists between stage 3 slice s3s and stage 4 switch slice 18B.

Unicast looping algorithm on stages 3, 4 and 5

The looping algorithm makes a connection from a stage 3 input S3S[s3s].I(s3i) to a stage 5 output S5S[s5s].O(s5o), where 's3s' is the stage 3 slice number, 's3i' is the stage3 input number of that stage 3 switch, 's5s' is the stage 5 slice number, and 's5o' is the output number of that stage 5 slice.

Figure 9:
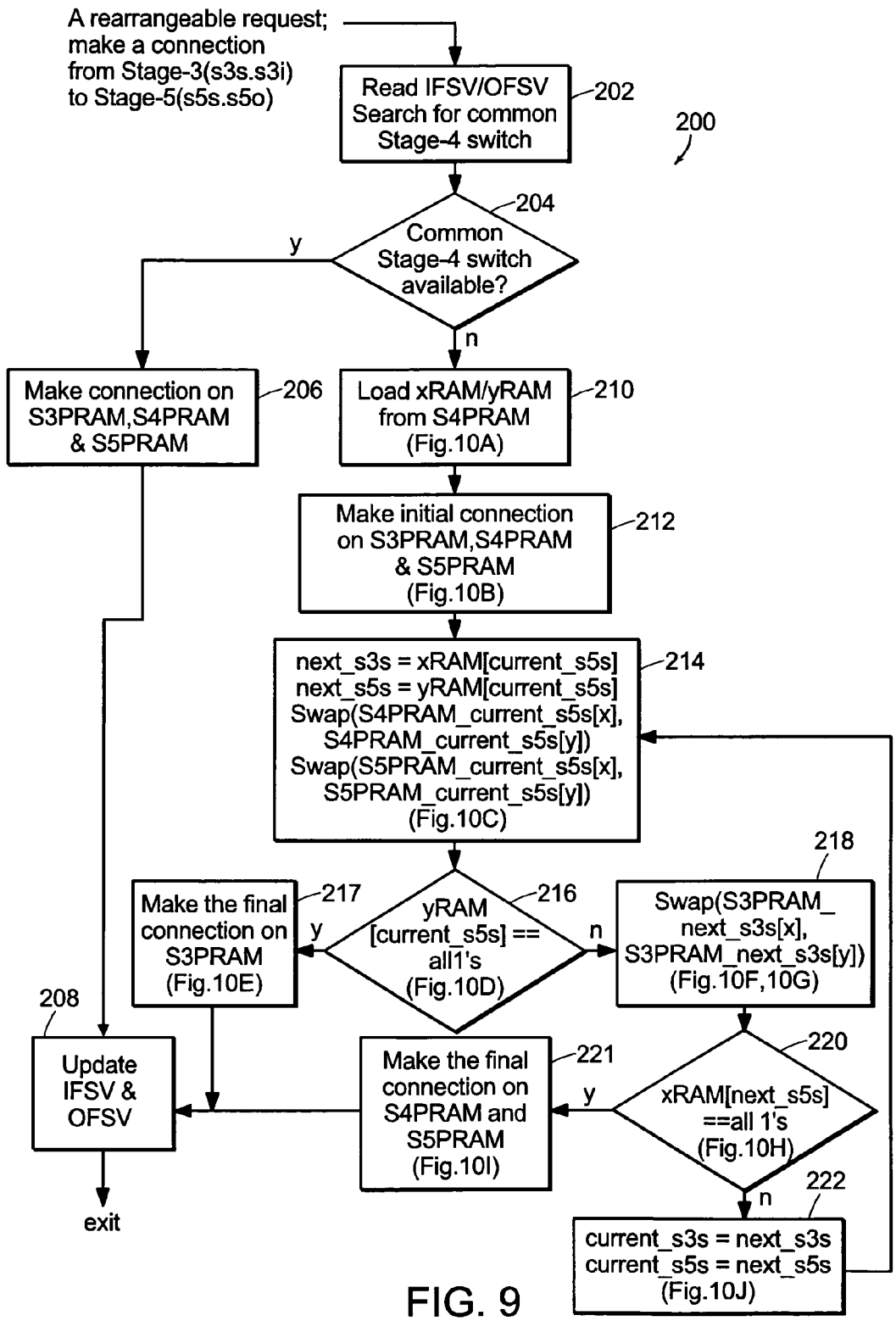
FIG. 9 is a flowchart of the unicast looping algorithm executed in FIG. 7.

FIG. 9 is a flowchart 200 of the unicast looping algorithm executed at both steps 106 and 122 of FIG. 7. This algorithm is executed for each rearrangeable request previously stored in the RRFIFO 47 (FIG. 2). FIG. 9 is described in conjunction with FIGS. 10A-10J.

At step 202, the input and output free slot vectors 43, 41 are searched for a common stage 4 switch slice for the requesting request. If a common stage 4 switch is available (determined at step 204), then at step 206 the connection is made on the appropriate S3, S4 and S5 PRAMS, respectively 57C, 57E and 57D. Finally, at step 208, the IFSV 43 and OFSV 41 are updated and the algorithm exits.

Figure 10A:
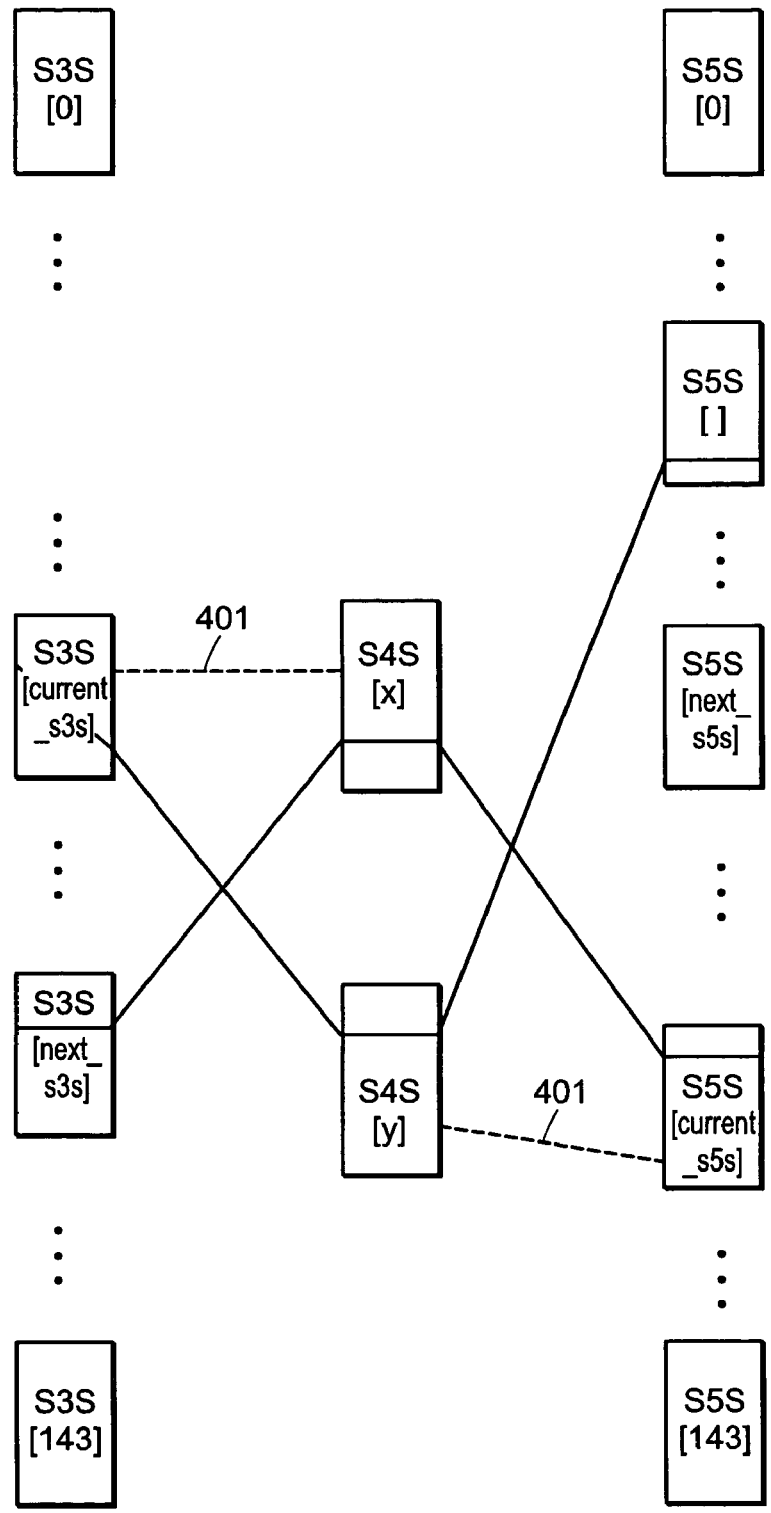
FIGS. 10A-10J are schematic diagrams illustrating the execution of the looping algorithm of FIG. 9.
Figure 10B:
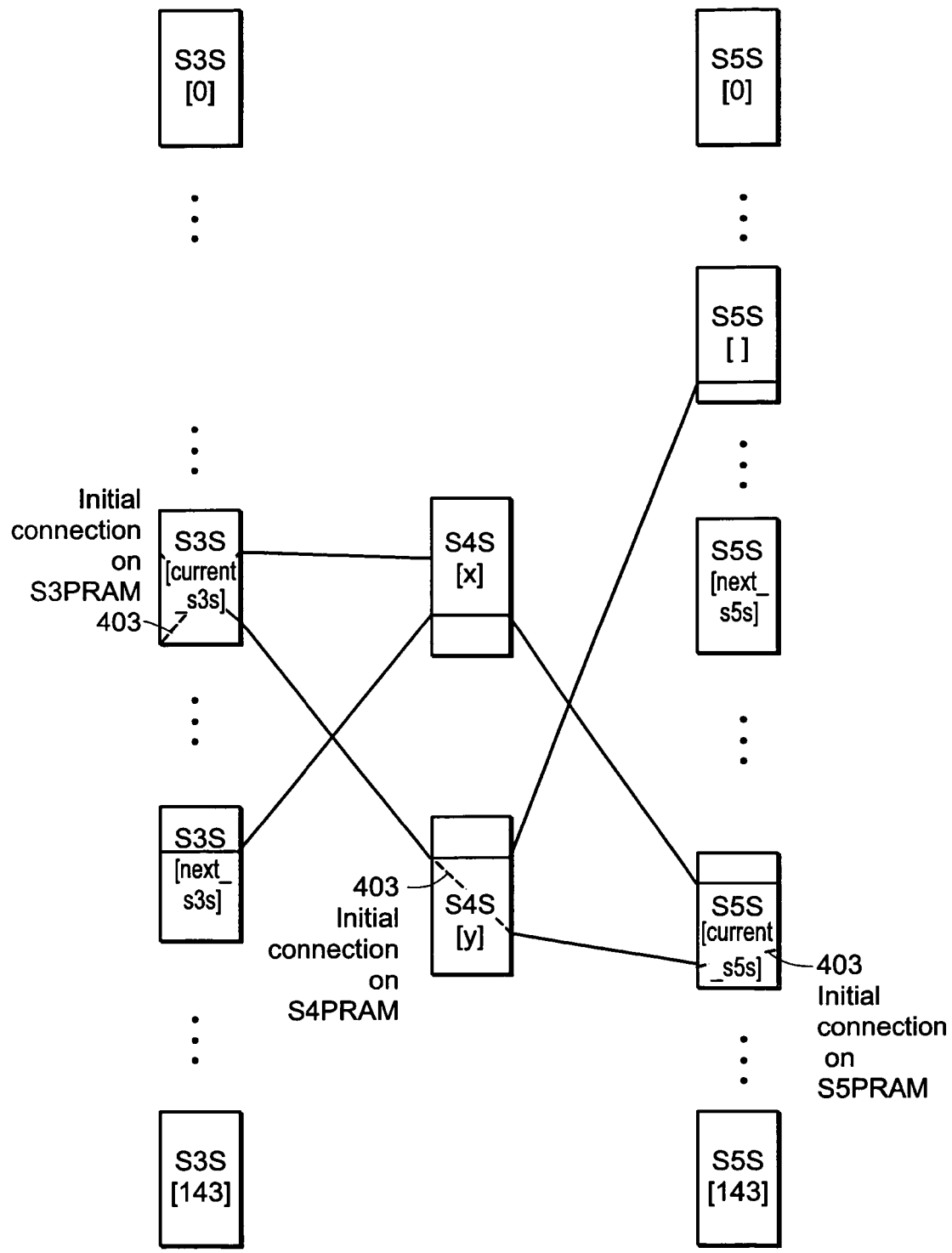
Figure 10C:
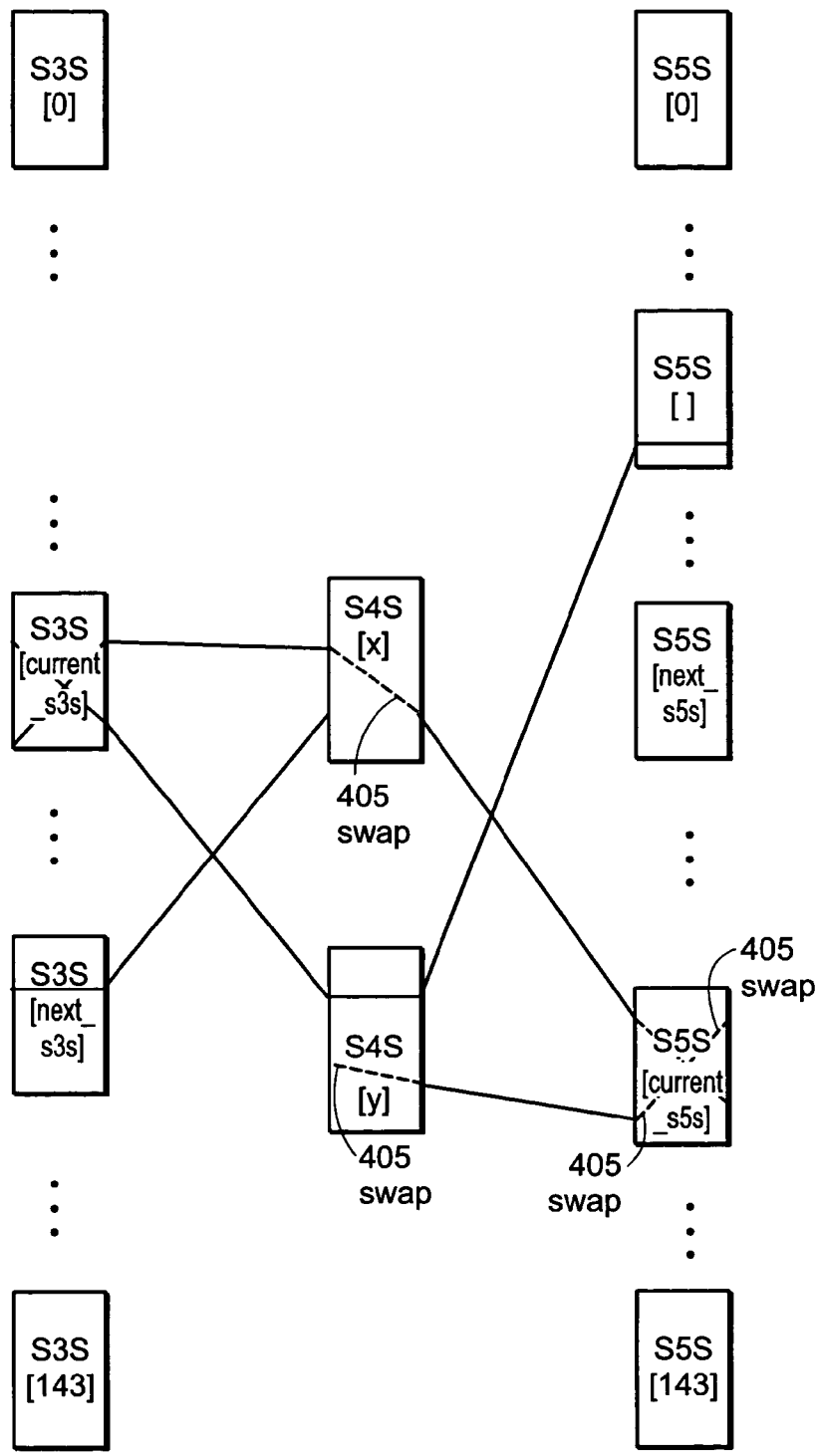

If, on the other hand, step 204 determines a common stage-4 switch is not available, then the xRAM 55 and yRAM 53 are loaded from the S4PRAM 57E at step 210. FIG. 10A illustrates an exemplary configuration as might be loaded from the S4PRAM. The dashed lines 401 show that the requested connection cannot be granted with the current configuration. Initial connections 403 are made at step 212 on the S3, S4 and S5 PRAMS, resulting in the configuration shown in FIG. 10B.

At step 214, using a fast look-up of the data contained in the xRAM and yRAM, connections are swapped (405) within the S4PRAM and S5PRAM, resulting in the configuration of FIG. 1C.

Figure 10D:
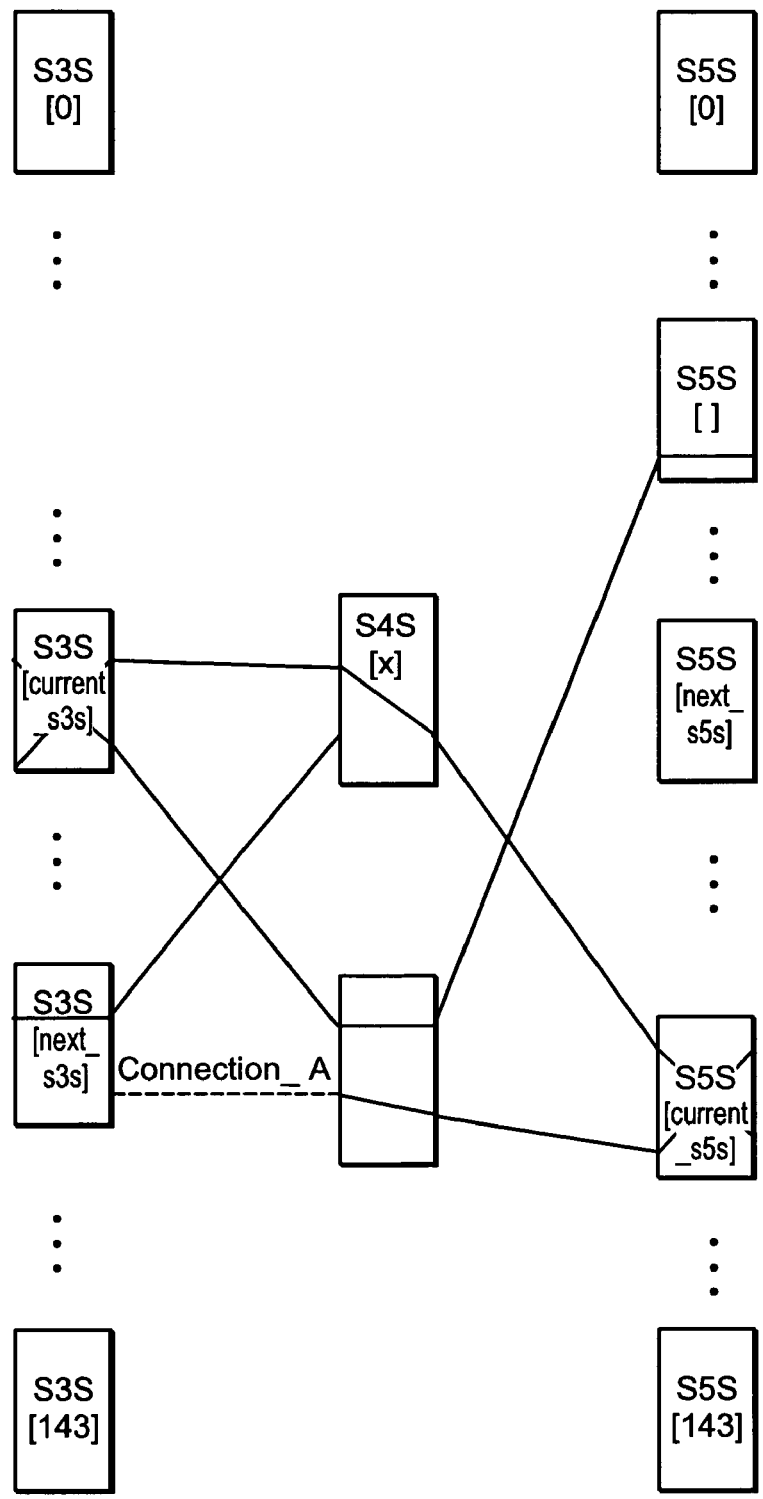
Figure 10E:
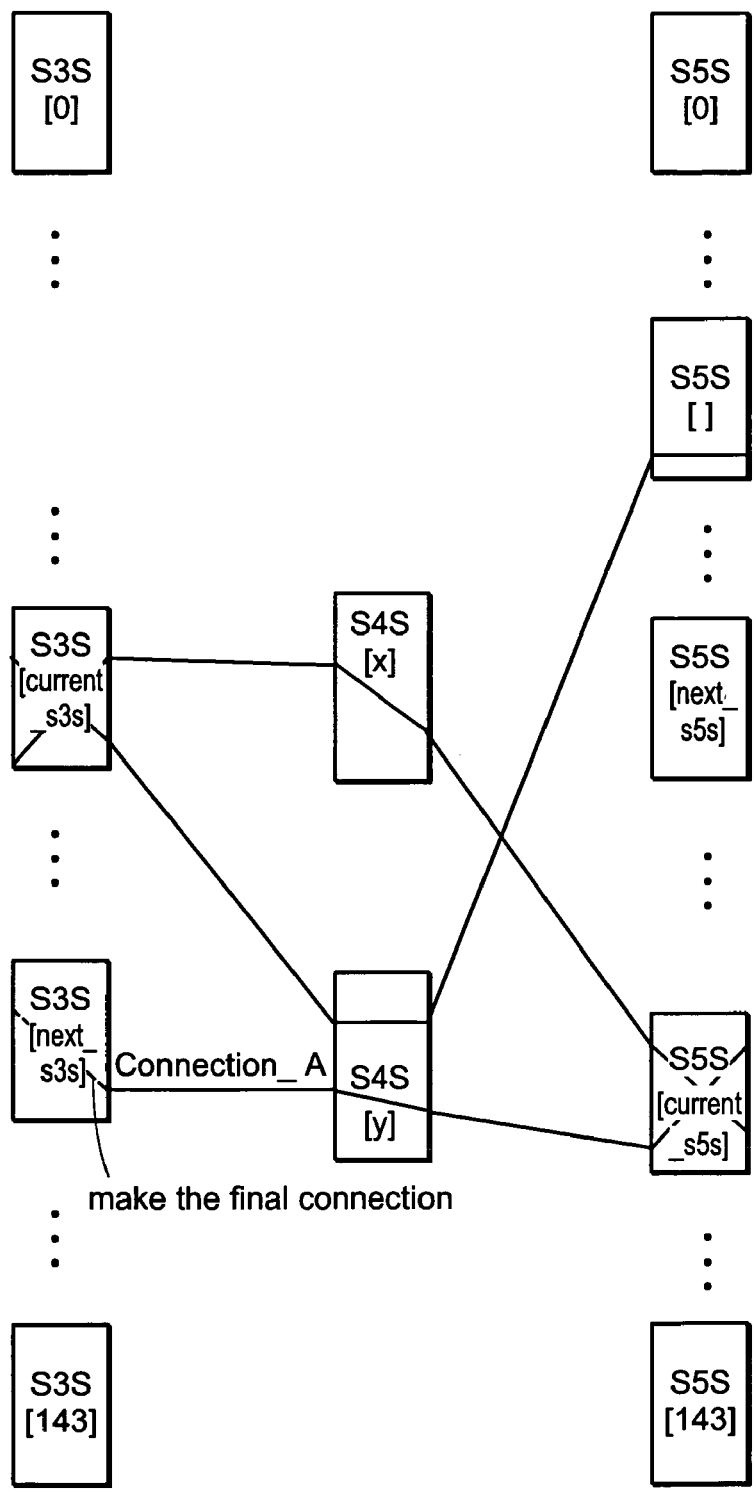

In step 216 a determination is made as to whether the yRAM entry is all ones, i.e., is Connection A in FIG. 10D already committed? If it is uncommitted, that is, the yRAM entry is all ones, then at step 217, the connection is made in the S3PRAM, resulting in the configuration shown in FIG. 10E. Next, step 208 is executed and the IFSV 43 and OFSV 41 are updated and the algorithm exits.

Figure 10F:
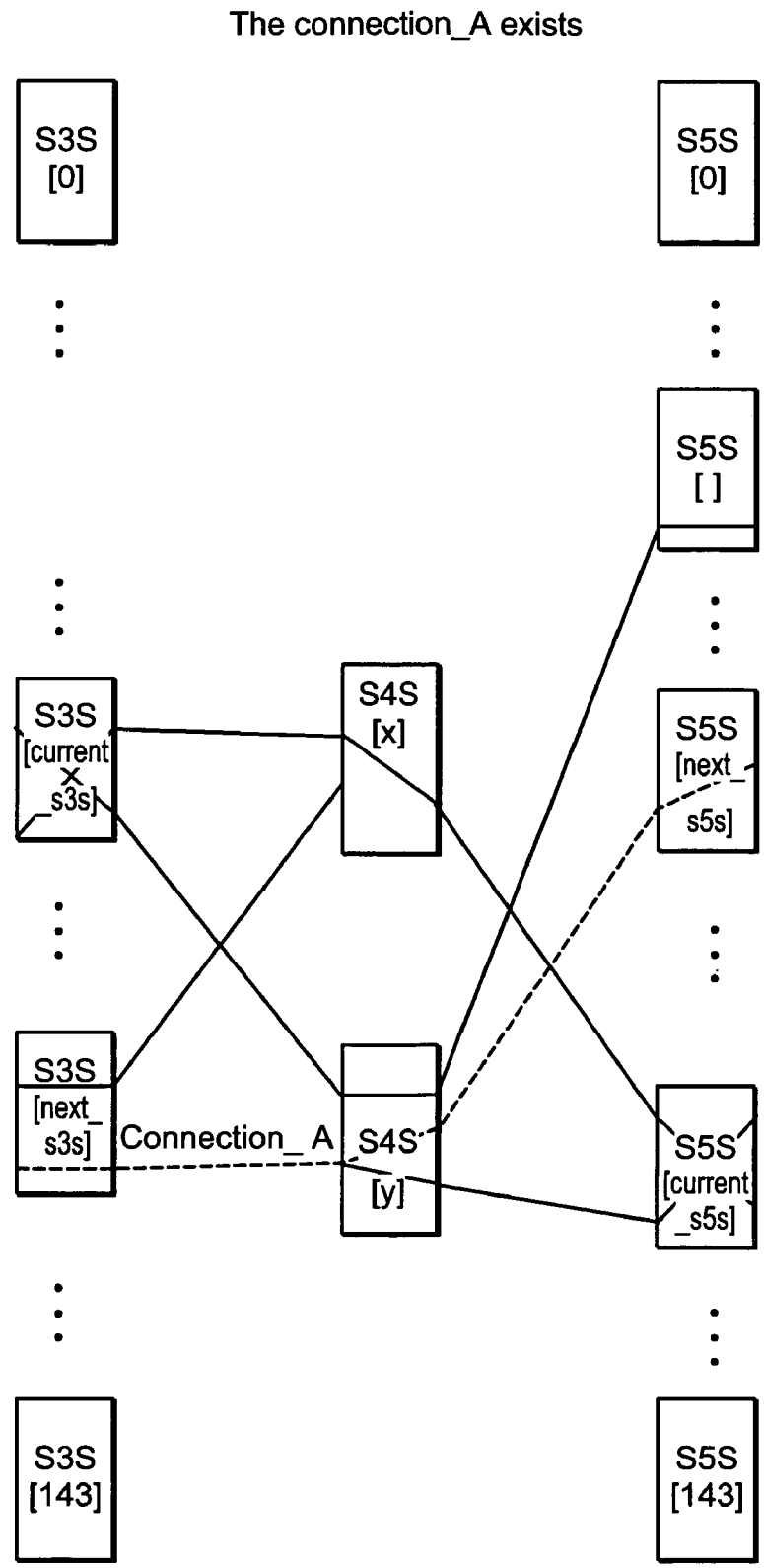
Figure 10G:
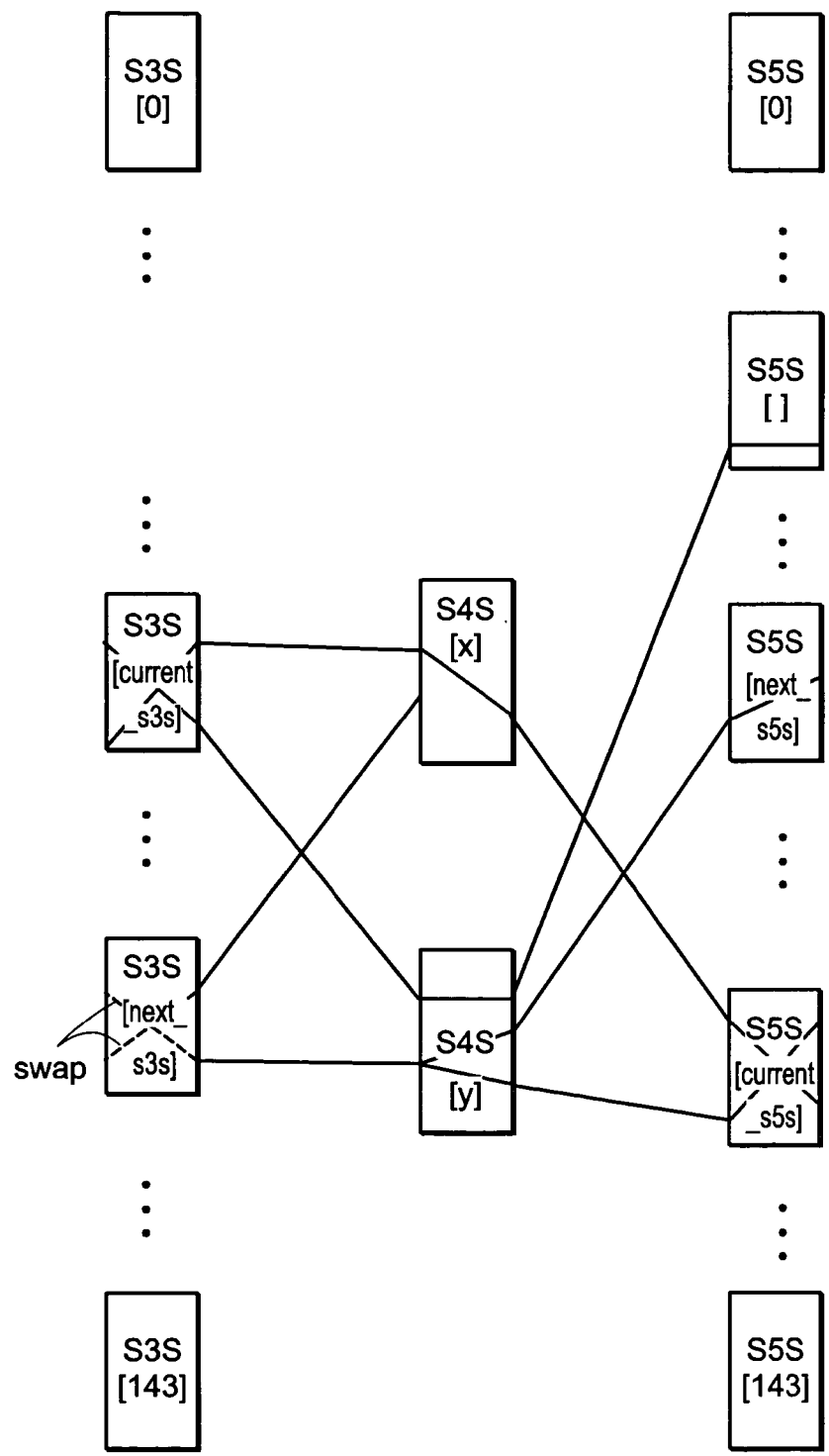

If, on the other hand, step 216 determines that Connection A is already committed, then at step 218, additional connections are made and swapped, resulting in the configurations of FIGS. 10F and 10G respectively.

Figure 10H:
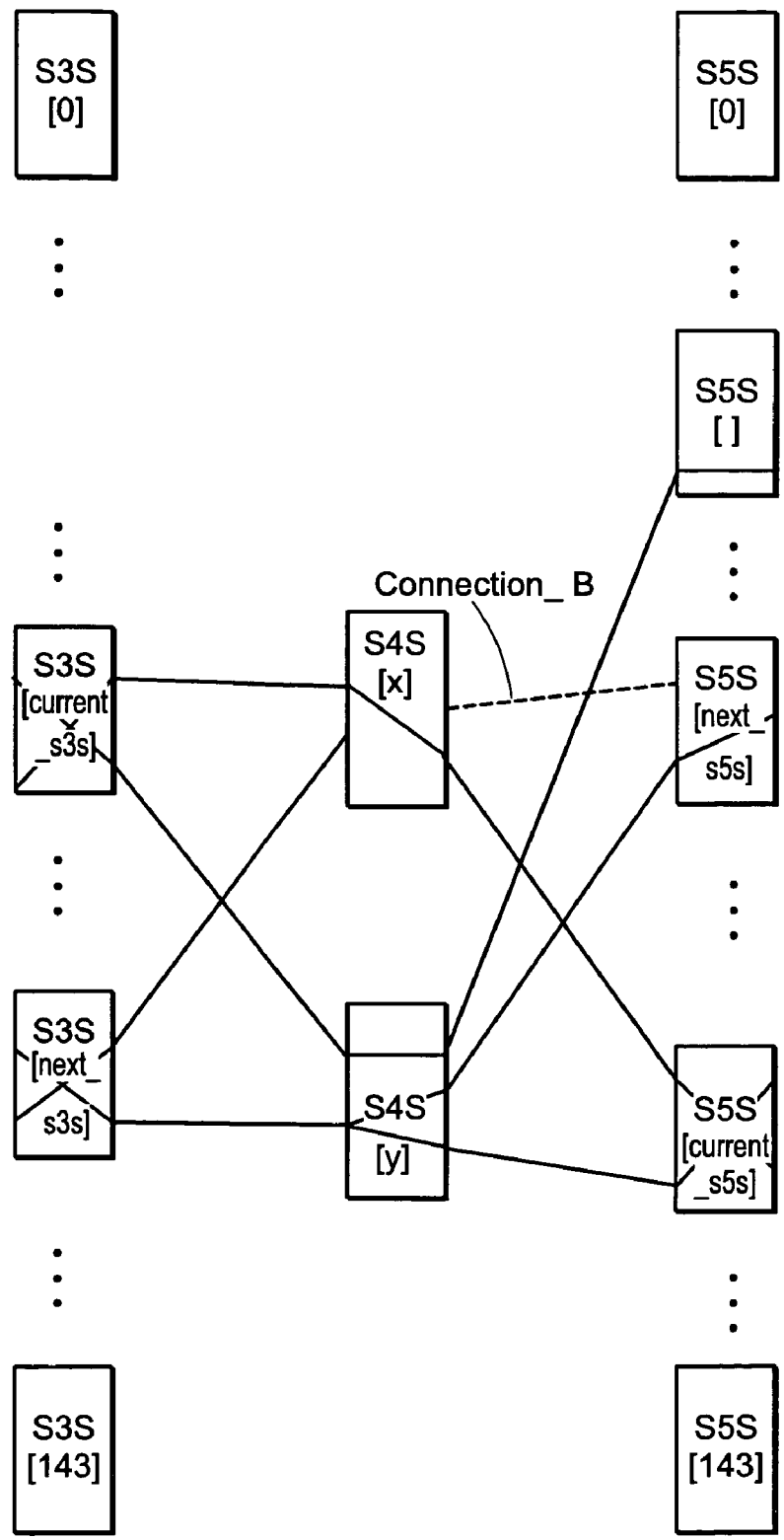
Figure 10I:
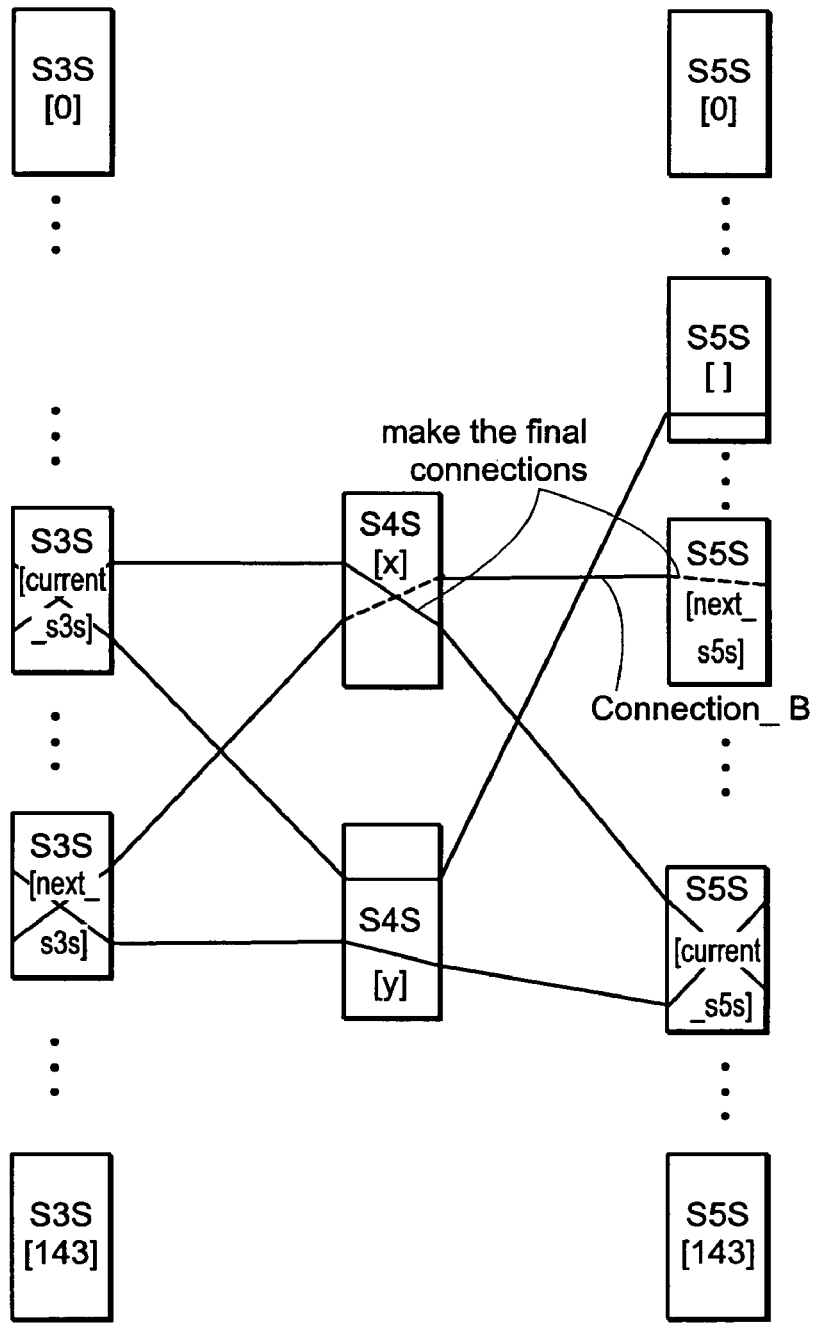
Figure 10J:
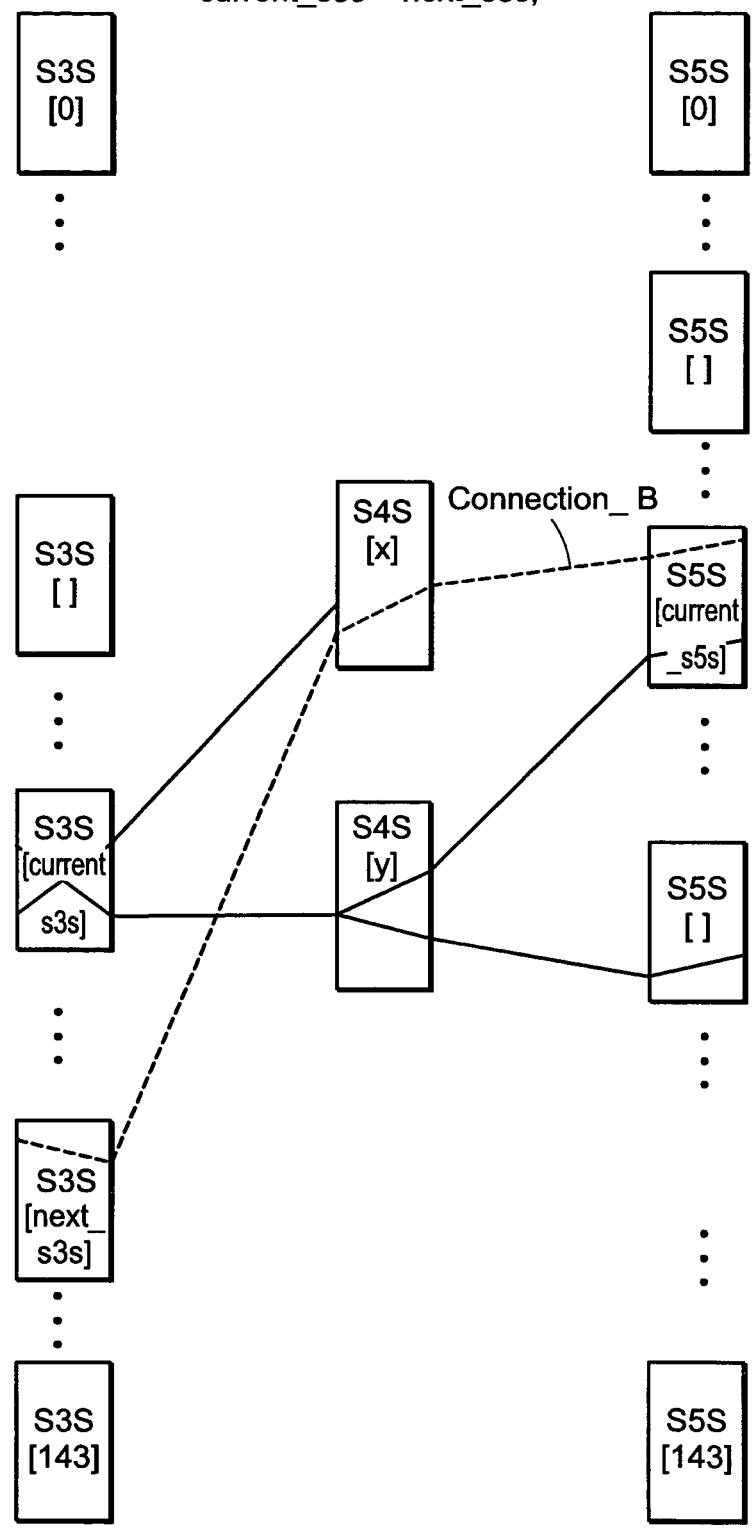

Next, in step 220 a determination is made as to whether the xRAM entry for next_s5s is all ones, i.e., is Connection B in FIG. 10H already committed? If it is uncommitted, that is, the xRAM entry is all ones, then at step 221, the final connection is made in the S4PRAM and S5PRAM, resulting in the configuration shown in FIG. 10I. Then, as before, the IFSV and OSFV are updated in step 208.

Of, on the other hand, step 220 determines that Connection B is already committed, then at step 222 the algorithm prepares to read the next pair of values from the xRAM and yRAM. Use of these values will result in the configuration of FIG. 10J.

The following pseudo code describes the looping function:

```
//makes a connection from Stage-3(s3s.s3i) to Stage5(s5s.s5o)
read IFSV[s3s];
read OFSV[s5s];
if ((IFSV[s3s]) & OFSV[s5s]) != 48'b0)
    begin // common Stage-4 switch
        get the first free common Stage-4 switch number
        's4s';
            write 's3i' to S3PRAM_s3s[s4s];
            write 's3s' to S4PRAM_s5s[s4s];
            write 's5o' to S5PRAM_s5s[s4s];
    end
else
    begin // no common Stage-4 switch
        get the first free Stage-4 switch number
        'x' for s3s;
        get the first free Stage-4 switch number
        'y' for s5s;
        load xRAM;
        load yRAM;
        write 's3i' to S3PRAM_s3s[x];
        write 's3s' to S4PRAM_s5s[y];
        write 's5o' to S5PRAM_s5s[y];
        current_s3s = s3s;
        current_s5s = s5s;
        while ( ) // looping
            begin
                next_s3s = xRAM[current_s5s];
                next_s5s = yRAM[current_s5s];
                swap S4PRAM_current_s5s[x] and
                S4PRAM_current_s5s[y];
                swap S5PRAM_current_s5s[x] and
                S5PRAM_current_s5s[y];
                if (yRAM[current_s5s] = = all 1's)
                    begin
                        S3PRAM_next_s3s[y] =
                        S3PRAM_next_s3s[x];
```

-continued

```
            S3PRAM_next_s3s[x] = all 1's;
            exit the loop;
        end
    else
        begin
            swap S3PRAM_next_s3s[x] and
            S3PRAM_next_s3s[y];
            if (xRAM[next_s5s] = all 1's)
                begin
                    S4PRAM_next_s5s[x] =
                    S4PRAM_next_s5s[y];
                    S4PRAM_next_s5s[y] =
                    all 1's;
                    S5PRAM_next_s5s[x] =
                    S5PRAM_next_s5s[y];
                    S5PRAM_next_s5s[y] =
                    all 1's;
                    exit the loop;
                end
        end
        current_s3s = next_s3s;
        current_s5s = next_s5s;
    end
end
update IFSV & OFSV;
```

In the hardware scheduler, all rearrangeable connections are stored temporarily in the RRFIFO 47. When the RRFIFO 47 is full, or the end of the ICT 49 is reached, the scheduler makes those rearrangeable connections using a pipeline (discussed below with reference to FIG. 11). A search is performed for a common Stage-4 switch which might have become available after the rearrangement in previous requests, in which case the connection is simply made.

Figure 11:
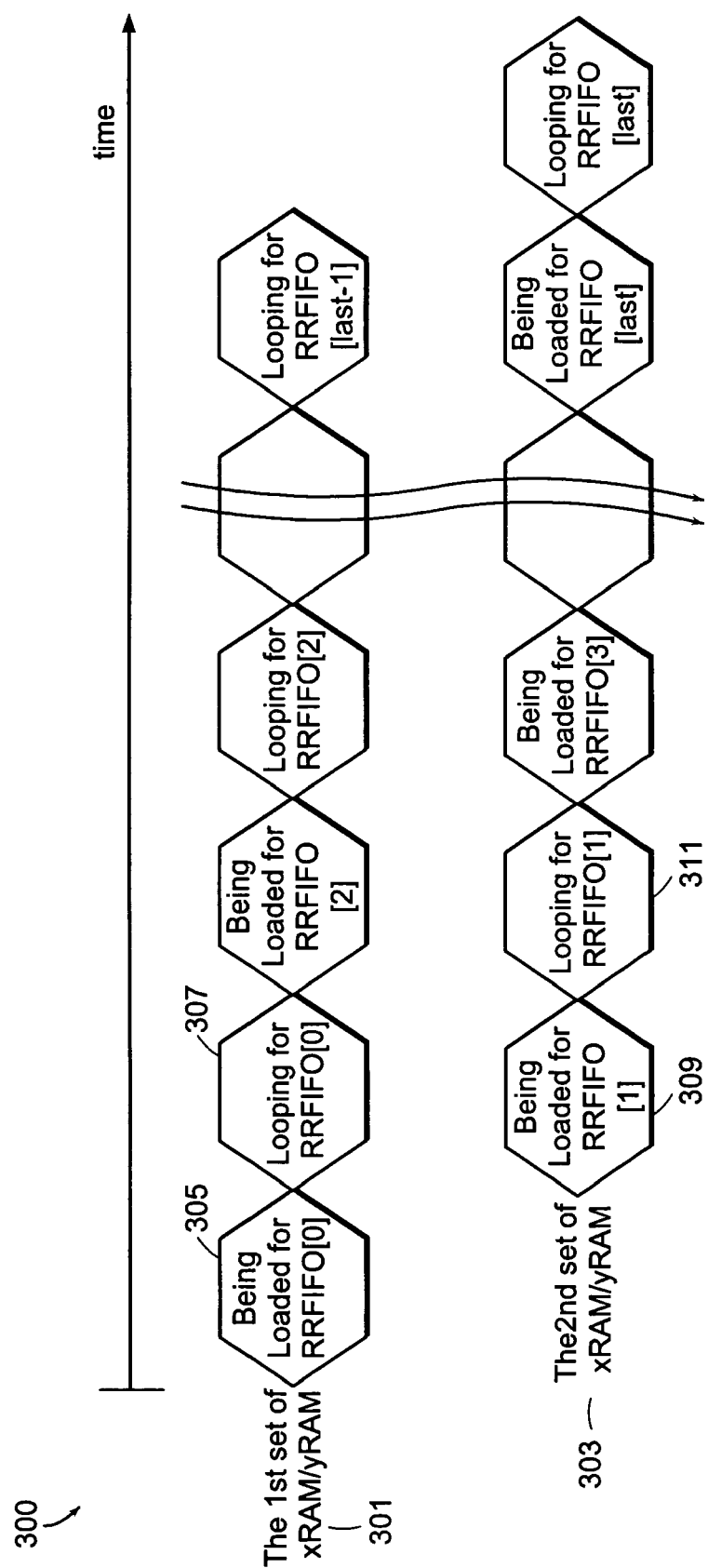
FIG. 11 is a timing diagram that illustrates alternating use of multiple sets of RRFIFO/xRAM/yRAM structures.

FIG. 11 is a timing diagram 300 that illustrates this alternating use of multiple sets of xRAM/yRAM structures. Graph 301 pertains to a first set, while graph 303 pertains to a second set. For example, at 305, a first set of xRAM and yRAM is loaded from SnPRAM. At 307, the loaded xRAM and yRAM are used by a first RRFIFO entry for performing the looping algorithm. Meanwhile, at the same time, at 309, a second set of xRAM and yRAM is loaded from SnPRAM, for subsequent use with the second RRFIFO entry (at 311). Thus, at every step, it is possible to be loading xRAM and yRAM for one RRFIFO entry, while executing the looping algorithm with another RRFIFO entry, effectively halving the execution time.

While this invention has been particularly shown and described with references to preferred embodiments thereof, it will be understood by those skilled in the art that various changes in form and details may be made therein without departing from the scope of the invention encompassed by the appended claims.

What is claimed is:

1. A switching method for a grooming switch having at least three switching stages comprising first, middle and last switch stages, the method comprising:
   accumulating a list of connection requests which cannot be granted given currently granted connection assignments, said requests for connecting inputs of the first switch stage to outputs of the last switch stage; and
   at a designated time, for each request in said list:
      dynamically building a first data structure that, for each output of a first switch slice of the middle stage, records a first value representing a configured input of the first switch slice that is currently assigned to said output,
      dynamically building a second data structure that records, for each output of the first switch slice of the middle stage, a second value representing an output of a second switch slice of said middle stage that is connected to an input of the second switch slice corresponding to said configured input of the first switch slice, and
      assigning connections to satisfy the stored unassigned requests, by reassigning existing connection assignments using the values recorded in the first and the second data structures.

2. The method of claim 1, the designated time being when the list holds a predetermined number of requests.

3. The method of claim 1, the designated time being when all requests have been examined.

4. The method of claim 1, the list being maintained in a buffer.

5. The method of claim 1, odd-numbered stages comprising time switch slices and even-numbered stages comprising space switch slices.

6. The method of claim 1, the grooming switch comprising a five-stage Clos network, stages one, three and five being time switches, and stages two and four being space switches.

7. The method of claim 6, said first, middle and last stages corresponding respectively to stages three, four and five of the Clos network.

8. The method of claim 1, the method providing rearrangeably non-blocking multicast connections for arbitrary fanouts.

9. The method of claim 1, there being plural sets of first and second data structures, the method further comprising:
   scheduling a connection using a first set of first and second data structures, while a second set of first and second data structures is being dynamically built.

10. The method of claim 1, each method step being performed by hardware.

11. The method of claim 1, further comprising:
   supporting dual frame alignment.

12. A hardware scheduler for a grooming switch having at least three switching stages comprising first, middle and last switch stages, the hardware scheduler comprising:
   a list which accumulates connection requests that cannot be granted given currently granted connection assignments, said requests for connecting inputs of the first switch stage to outputs of the last switch stage;
   a first data structure, dynamically constructed for each request in the list at a designated time, that for each output of a first switch slice of the middle stage, records a first value representing a configured input of the first switch slice that is currently assigned to said output;
   a second data structure, dynamically constructed for each request at the designated time, that records, for each output of the first switch slice of the middle stage, a second value representing an output of a second switch slice of said middle stage that is connected to an input of the second switch slice corresponding to said configured input of the first switch slice; and
   a scheduling engine that assigns connections to satisfy the stored unassigned requests, by reassigning existing connection assignments using the values recorded in the first and the second data structures.

13. The hardware scheduler of claim 12, the designated time being when the list holds a predetermined number of requests.

14. The hardware scheduler of claim 12, the designated time being when all requests have been examined.

15. The hardware scheduler of claim 12, the list being maintained in a buffer.

16. The hardware scheduler of claim 12, odd-numbered stages comprising time switch slices and even-numbered stages comprising space switch slices.

17. The hardware scheduler of claim 12, the grooming switch comprising a five-stage Clos network, stages one, three and five being time switches, and stages two and four being space switches.

18. The hardware scheduler of claim 17, said first, middle and last stages corresponding respectively to stages three, four and five of the Clos network.

19. The hardware scheduler of claim 12, the rearrangeably non-blocking multicast connections being provided for arbitrary fanouts.

20. The hardware scheduler of claim 12, further comprising plural sets of first and second data structures, the scheduling engine scheduling a connection using a first set of first and second data structures, while a dynamically building a second set of first and second data structures.

21. The hardware scheduler of claim 12, the hardware scheduler supporting dual frame alignment.

22. A hardware scheduler for a grooming switch having at least three switching stages comprising first, middle and last switch stages, the hardware scheduler comprising:

means for accumulating a list of connection requests which cannot be granted given currently granted connection assignments, said requests for connecting inputs of the first switch stage to outputs of the last switch stage;

means for dynamically building a first data structure that, for each output of a first switch slice of the middle stage, records a first value representing a configured input of the first switch slice that is currently assigned to said output;

means for dynamically building a second data structure that records, for each output of the first switch slice of the middle stage, a second value representing an output of a second switch slice of said middle stage that is connected to an input of the second switch slice corresponding to said configured input of the first switch slice; and means for assigning connections to satisfy the stored unassigned requests, including means for reassigning existing connection assignments using the values recorded in the first and the second data structures.

23. The hardware scheduler of claim 22, wherein at a designated time said first and said second data structures are built for each request in said list.

* * * * *